US006374334B1

United States Patent
Suga et al.

(10) Patent No.: US 6,374,334 B1
(45) Date of Patent: *Apr. 16, 2002

(54) DATA PROCESSING APPARATUS WITH A CACHE CONTROLLING DEVICE

(75) Inventors: Atsuhiro Suga; Akitoshi Ino; Tsutomu Tanaka; Hideki Sakata, all of Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,561

(22) Filed: Oct. 20, 1997

Related U.S. Application Data

(63) Continuation of application No. 08/497,977, filed on Jul. 3, 1995, now abandoned.

(30) Foreign Application Priority Data

Jul. 4, 1994 (JP) ............................................. 6-152446

(51) Int. Cl.[7] ........................... G06F 12/08; G06F 13/18
(52) U.S. Cl. ....................... 711/158; 711/151; 711/210; 710/55; 710/244
(58) Field of Search ..................... 395/800.23, 381–384, 395/388–389, 390–395; 711/158, 210, 150–152; 712/216; 710/55, 264, 244, 260

(56) References Cited

U.S. PATENT DOCUMENTS

| | | | | |
|---|---|---|---|---|
| 4,217,640 A | * | 8/1980 | Porter et al. | ............. 395/183.1 |
| 4,789,925 A | * | 12/1988 | Lahti | ........................... 395/800 |
| 4,933,901 A | * | 6/1990 | Tai et al. | ................ 365/189.07 |
| 5,125,083 A | * | 6/1992 | Fite et al. | .................... 395/375 |
| 5,379,379 A | | 1/1995 | Becker et al. | |
| 5,432,918 A | * | 7/1995 | Stamm | ........................ 395/483 |
| 5,471,598 A | * | 11/1995 | Quattromani et al. | ........ 395/449 |
| 5,659,782 A | * | 8/1997 | Senter et al. | .......... 395/800.23 |

FOREIGN PATENT DOCUMENTS

| | | | |
|---|---|---|---|
| JP | 57044279 A | 3/1982 | |
| JP | 58029187 A | 2/1983 | |
| JP | 58208982 A | 12/1983 | |
| JP | 59136859 A | 8/1984 | |

(List continued on next page.)

OTHER PUBLICATIONS

Communication from the Japanese Patent Office, A Notice of Grounds for Rejection, mailed Nov. 28, 2000 for the counterpart Japanese Patent Application, no Translation. Prior Art Information List (2 pages).

*Primary Examiner*—Matthew Kim
*Assistant Examiner*—Denise Tran
(74) *Attorney, Agent, or Firm*—Staas & Halsey LLP

(57) ABSTRACT

A data processing apparatus temporarily stores data to a cache write buffer and then stores the data in a cache storing device. The cache storage device performs a data storage operation with precedence over another operation even if a store instruction contends with a read instruction for accessing the cache storing device. A storage request low signal, sent from a cache write buffer controlling device to a cache controlling device, allows a read request to have precedence over a store instruction even when there is data stored in the cache write buffer waiting to be transferred to the cache storing device in response to the store instruction. However, when the read instruction contends with the store instruction and a state transition signal, such as an instruction cancellation signal generated from an instruction controlling device, is detected, the cache write buffer controlling device changes the output signal to a storage request high signal that causes the storage operation to have precedence over the read operation.

18 Claims, 22 Drawing Sheets

FOREIGN PATENT DOCUMENTS

| | | |
|---|---|---|
| JP | 61131047 A | 6/1986 |
| JP | 61220045 A | 9/1986 |
| JP | 61220046 A | 9/1986 |
| JP | 01082149 A | 3/1989 |
| JP | 01280851 A | 11/1989 |
| JP | 01305452 A | 12/1989 |
| JP | 02236748 A | 9/1990 |
| JP | 04145552 A | 5/1992 |
| JP | 05020192 A | 1/1993 |
| WO | WO 94/08287 | 4/1994 |

\* cited by examiner

DATA PROCESSING APPARATUS WITH A CACHE CONTROLLING DEVICE

This application is a continuation, of application Ser. No. 08/497,977, filed Jul. 3, 1995, now abandoned.

BACKGROUND OF THE INVENTION

1. Field of the Invention

The present invention relates to a data processing apparatus with a cache memory (for example, a microprocessor), in particular, to a data processing apparatus with a cache controlling device that causes either of a data write request sent from a cache write buffer to a cache memory or a data read request sent from the cache memory to have precedence over the other, according to various conditions.

2. Description of the Related Art

FIG. 1 is a block diagram showing the configuration of a conventional cache block and a conventional CPU block. In FIG. 1, the cache block comprises a data cache storing device 1, a data cache controlling device 2 that controls data input and data output to and from the data cache storing device 1, and a cache write buffer 3 that temporarily stores data to be written to the data cache storing device 1. The CPU block comprises an instruction controlling device 4 that outputs, for example, a load/store instruction to the data cache controlling device 2, an arithmetic processing device 5 that performs various arithmetic operations, and a register file 6 that stores arithmetic operation data and so forth.

In FIG. 1, when the CPU block detects the load/store instruction, the CPU block causes the data cache controlling device 2 to execute the instruction. The arithmetic processing device 5 calculates a cache access address (data address). The cache access address is supplied to the data cache controlling device 2 and the data cache storing device 1. When the load instruction is detected, after it is determined whether or not a cache hit takes place, the load data is output from the data cache storing device 1 to the register file 6. When the store instruction is detected, store data is temporarily written from the register file 6 to the cache write buffer 3. A data storage request is output from the cache write buffer 3 to the data cache controlling device 2. In accordance with the data storage request the data cache controlling device 2 causes the data cache storing device 1 to store the swore data of the cache write buffer 3.

FIG. 2 is an operation time chart showing the execution of the load instruction shown in FIG. 1. In FIG. 2, when the data cache controlling device 2 receives the load instruction along with the data address at cycle T1, it accesses the cache memory at cycle T2. The data cache storing device 1 comprises a cache tag that stores a line address of the cache memory and a random access memory (RAM) portion. At cycle T2, both the cache tag and the RAM are accessed. At cycle T3, it is determined whether or not the read request data is stored in the cache (namely, a cache test takes place). When a cache hit is determined, the load data that is read from the cache memory is sent to the register file 6.

FIG. 3 is an operation time chart of the store instruction shown in FIG. 1. In FIG. 3, when the data cache controlling device 2 receives the store instruction along with the data address at cycle T1, as with the case of the load instruction shown in FIG. 2, the cache memory is accessed at cycle T2. At cycle T3, it is determined whether or not a cache hit takes place. When the store instruction is an instruction that causes data stored in the data cache storing device 1 to be rewritten, it is determined that a cache hit takes place. As shown in FIG. 1, the store data is stored in the cache write buffer 3 at cycle T4.

The store data stored in the cache write buffer 3 is stored in the data cache storing device 1 with precedence over, another instruction, for example, the load instruction. Alternatively, the store data is stored at a cycle at which another instruction such as the load instruction is not executed. In this case, the storage request of the store data that is output from the cache write buffer 3 is sent to the data cache controlling device 2. Corresponding to the storage request, the data cache controlling device 2 causes the data cache storing device 1 to store the store data. Since data to be stored in the cache is stored in the cache write buffer 3 at cycle T4, the cache storage request is sent to the data cache controlling device 2. When there is no instruction to be executed next, the storage data is stored in the data cache storing device 1 at cycle T5.

FIG. 4 is an operation time chart in the case that the data storage request that is sent from the cache write buffer3 to the data cache storing device 1 corresponding to the store instruction shown in FIG. 3, and the load instruction that causes data to be read from the data cache controlling device 2, contend. In FIG. 4, the operation will be described with an assumption that the store instruction has precedence over the load instruction. The, operations at cycles T1 to T3 of FIG. 4 are the same as those of FIG. 3. In FIG. 4, at cycle T4, the load instruction is supplied to the data cache controlling device 2 along with the data address.

In other words, at cycle T4, the cache storage request from the cache write buffer 3 and the load instruction contend. In this case, since the store instruction has precedence over the load instruction, the load instruction is not received at this cycle. Thus, data is stored from the cache write buffer 3 to the data cache storing device 1. Consequently, the load instruction is not received until the next cycle (cycle T5). At cycle T5, an instruction response that represents that the load instruction can be received is sent to the instruction controlling device 4. At cycle T6, the cache memory is accessed. At T7, when a cache hit is determined, the load data is output to the register file 6.

FIG. 5 is an operation time chart in the case that the store instruction and the load instruction contend. In this case, the load instruction has precedence over the store instruction. The operations at cycles T1 to T3 shown in FIG. 5 are the same as those shown in FIG. 3 as with the case shown in FIG. 4. At cycle T4, the load instruction and the data address are supplied to the data cache controlling device 2. Thus, the load instruction and the cache storage request contend. In this case, the load instruction has precedence over the cache storage request. Thus, at cycle T4, the instruction response is sent to the instruction controlling device 4. At cycle T5, the cache memory is accessed. At cycle T6, a cache hit is determined. The load data is output to the register file 6. The cache storage request sent from the cache write buffer 3 at cycle T4 is received by the data cache controlling device 2 at cycle T5. Thus, a cache storage response is output. At cycle T6, the store data is stored in RAM of the data cache storing device 1.

As described in FIG. 5, if the load instruction has precedence over the other instruction, after the load instruction is received and the signal level of the instruction response to the load instruction becomes "L", the store data is sent from the cache write buffer to the data cache storing device. If the load instruction is cancelled, the store data cannot be sent from the cache write buffer to the data cache storing device.

FIG. 6 is a time chart for explaining such a problem. In FIG. 6, as with the case shown in FIG. 5, the load instruction and the cache storage request contend at cycle T4. When the load instruction has precedence over the other instruction, the store data is not stored in the cache memory at cycle T4. At cycle T5, the load instruction cancellation signal is sent from the instruction controlling device 4 to the data cache controlling device 2. This cancellation signal is sent from the instruction controlling device 4 to the data cache controlling device 2 in the case, for example, when the execution of an instruction of the CPU is stopped due to a particular cause. Next, the instruction cancellation signal will be described with reference to FIG. 7.

In FIG. 7, it is assumed that a pipeline of the instruction controlling device is composed of three stages that are a decode stage (D) in which an instruction is decoded, an execution stage (E) in which an instruction is executes, and a write stage (W) in which the execution result is written. If the execution stage is interlocked due to a particular cause after the decode stage of the pipeline, the cache controlling device executes a pipeline composed of three stages that are a priority check P corresponding to the E stage of the instruction, a tag determination T, and a cache hit determination C, after an instruction is issued from the instruction controlling device. When the E stage is interlocked three times in the instruction controlling device, a priority check stage of a pipeline (1) and a tag determining stage and a hit determining stage of a pipeline (4) become valid. The operations from a tag determining stage of the pipeline (1) to a priority check stage of the pipeline (4) are cancelled.

In FIG. 6, the load instruction cancellation signal is sent to the data cache controlling device 2 at cycle T5. While the load instruction cancellation signal is being issued, the store data stored in the cache write buffer 3 is not sent to the data cache storing device 1. In other words, the load instruction supplied from the instruction controlling device 4 at cycle T4 is cancelled at cycle T5. However, since the load instruction still maintains the access right to the data cache storing device 1, the store data to be sent to the cache write buffer 3 is not sent to the cache memory due to the invalid load instruction.

When the load instruction to be cancelled and the stored instruction contend, the period during which the store instruction and the load instruction interfere with each other becomes long. In addition, depending on the canceling method, a serious problem may arise, that is, the system may not work properly.

SUMMARY OF THE INVENTION

An object of the present invention is to provide a data processing apparatus that allows data sent from a cache write buffer to a cache memory to have the precedence over another instruction, even if a store instruction sent from the cache write buffer to the cache memory and the other instruction such as a load instruction contend.

To accomplish such an object, the data processing apparatus according to the present invention comprises a cache store data storing portion (for example, a cache write buffer) and a cache controlling portion (for example, a data cache controlling device).

The cache store data storing portion temporarily stores store data to be stored in the cache storing device. When store data is supplied from, for example a register file, the data is written to the cache store data storing portion. Thereafter, a data storage request that is, for example a storage request low signal, is output from the cache store data storing portion to the cache controlling portion.

The cache controlling portion (for example, the data cache controlling device) executes one of a control operation that causes a data read request received from the cache storing device against, for example a load instruction, to have precedence over a data storage request that is output from, the cache store data storing portion for example, the cache write buffer, and a control operation that causes the data storage request to have precedence over the data read request when the data read request and the data storage request contend.

The cache store data storing portion comprises, for example, one or more cache write buffers and a cache write buffer controlling device that controls data input and data output to and from the cache write buffer. When data to be stored in the cache storing device is written to the one or more cache write buffers, the data storage request is output as, for example, a storage request low signal. The storage request low signal causes the data read request against the load instruction to have precedence over the storage of the data to the cache storing device against the storage request. When the storage request and the data read request against the load instruction contend, the data read process has the precedence over the storage request. The data storage against the storage request is executed after the signal level of the instruction response to the storage request becomes "L".

According to the present invention, even if the store instruction and the load instruction contend and the load instruction has precedence over the store instruction, an instruction cancellation signal against the load instruction received from, for example the instruction controlling device, is input to the cache write buffer controlling device. Alternatively, an address conversion validity signal that is output from an address conversion controlling device is input to the cache write buffer controlling device. As a further alternative, after a predetermined number of cycles elapses after data is written to the cache write buffer, a storage request high signal instead of the storage request low signal is output from the cache write buffer controlling device to the cache controlling portion. The storage request high signal causes the data storage performed from the cache write buffer to the cache storing device to have the precedence over the data read process against the load instruction. The cache controlling portion causes the data storage process to have precedence over the other operation. Thus, data is stored in the cache storing device.

Consequently, even if the store instruction contends with the load instruction, the data storage process performed from the cache write buffer to the cache memory has the precedence over the other operation.

These and other object, features and advantages of the present invention will become more apparent in light of the following detailed description of a best mode embodiment thereof, as illustrated in the accompanying drawing.

DESCRIPTION OF PREFERRED EMBODIMENTS

Figure 8:
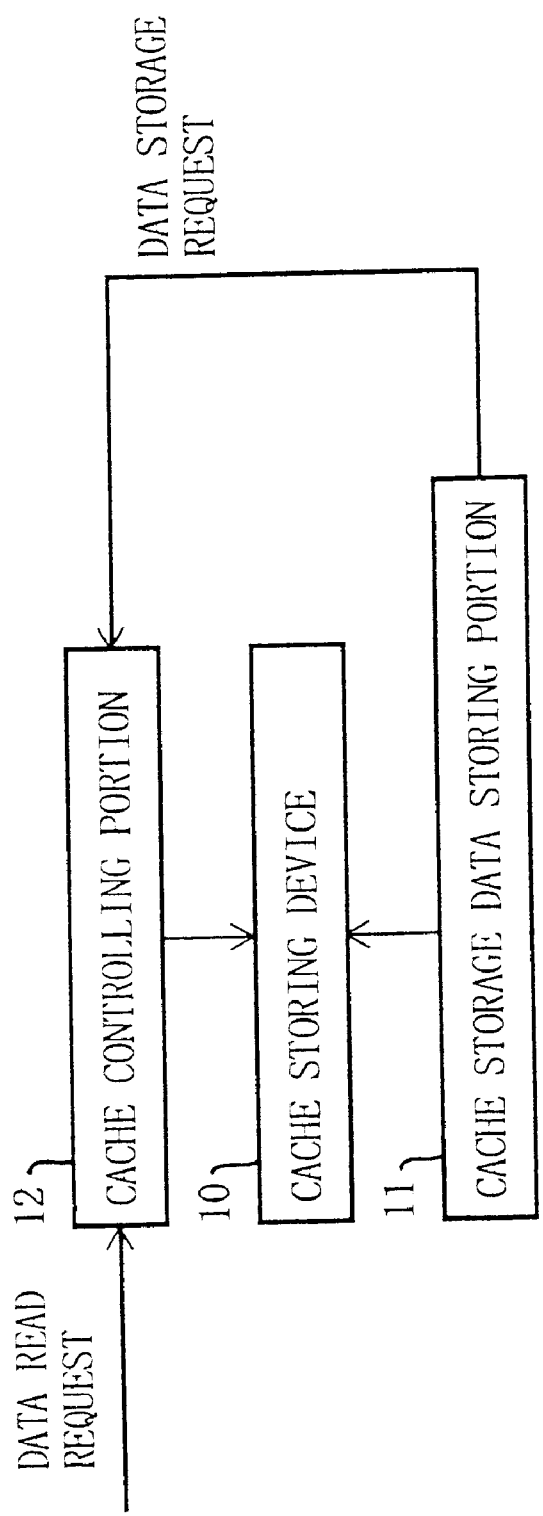
FIG. 8 is a block diagram showing the theory of the present invention.

FIG. 8 is a block diagram showing the theoretical construction of a data processing apparatus having a cache storing device 10 according to the present invention.

In FIG. 8, a cache storage data storing portion 11 is, for example, a cache write buffer. The cache storage data storing portion 11 temporarily stores data to be stored in a cache storing device 10. Storage data is supplied from, for example, a register file in a central processing unit (CPU) of the data processing apparatus corresponding to a data storage request, and stored in the cache store data storing portion 11. When the storage data is stored, a data storage request is output from the cache storage data storing portion 11 to a cache controlling portion 12.

The cache controlling portion 12 is, for example, a data cache controlling device. The cache controlling portion 12 executes a control operation in which a data read request received from the cache storing device 10 against the load instruction received from an instruction controlling device of, for example a CPU, has precedence over a data storage request received from the cache storage data storing portion 11, when these requests contend with each other, or a control operation in which the data storage request has precedence over the data read request.

According to the present invention, the cache storage data storing portion 11 comprises at least one of cache write buffers that store data written to the cache storing device 10 and a cache write buffer controlling device that controls the cache write buffer.

The cache write buffer controlling device outputs one of a storage request high signal and a storage request low signal to the cache controlling portion 12, when one of the cache write buffers stores data to be stored in the cache storing device 10. The storage request high signal causes the storage process of the cache storing device 10 to have precedence over the data read request against, for example, the load instruction. In contrast, the storage request low signal causes the data read request to have precedence over the data storage process. The cache controlling portion 12 controls the data storage process performed from the cache write buffer to the cache storing device 10, corresponding to which one of the storage request high signal and the storage request low signal is input.

According to the present invention, when the store instruction contends with the load instruction, if the control operation that causes the load instruction to have precedence over the other operation, after an instruction cancellation signal against the load instruction is input from an instruction controlling device of, for example, a CPU to the cache write buffer controlling device, the storage request high signal is sent from the cache write buffer controlling device to the cache controlling portion 12. Thus, the cache controlling portion 12 performs the control operation that causes the data storage process performed from the cache write buffer to the cache storing device 10 to have precedence over the data read request against the load instruction to the cache storing device 10. Thus, the data stored in the cache write buffer is stored in the cache storing device 10.

As described above, according to the present invention, even if, for example, a store instruction contends with, for example a load instruction, and the load instruction is cancelled, the store data stored in the cache buffer is effectively stored in the cache storing device.

Figure 1:
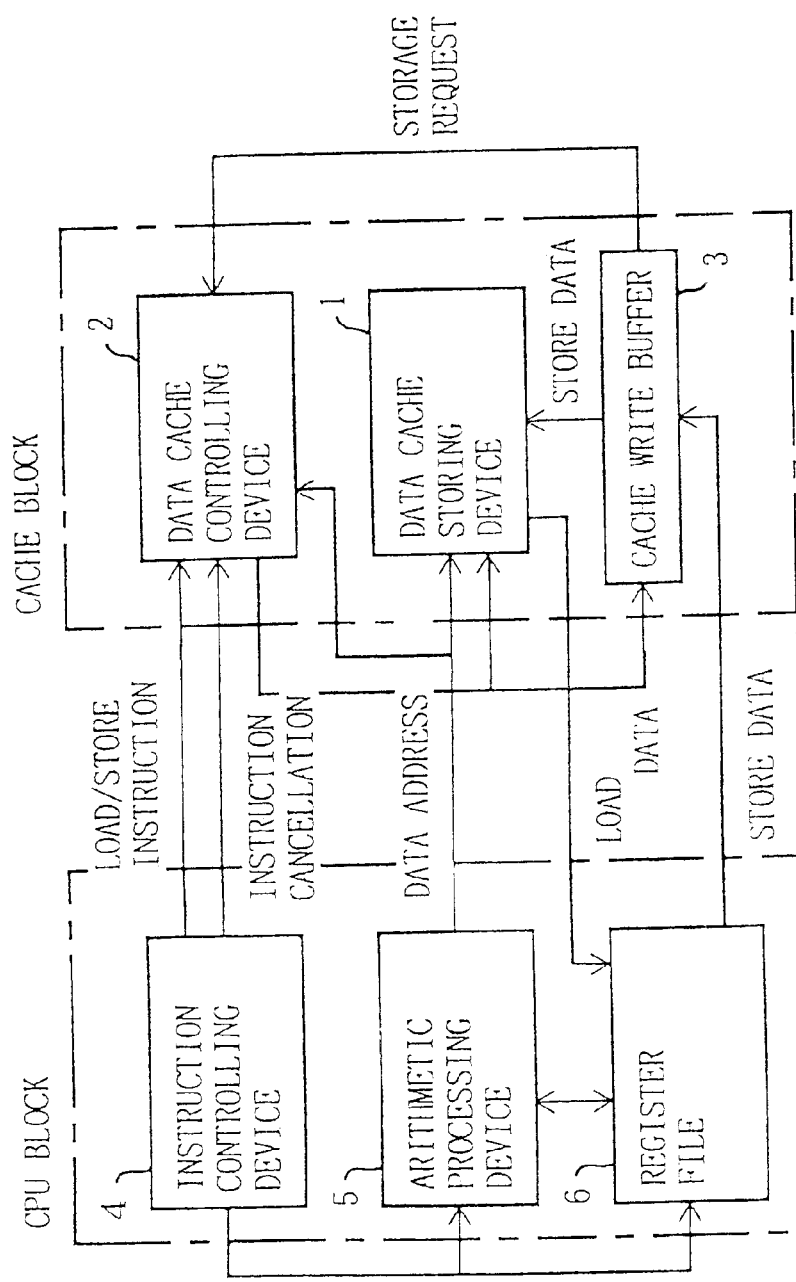
FIG. 1 is a block diagram showing the configuration of a cache block and a CPU block of a related art reference.
Figure 2:
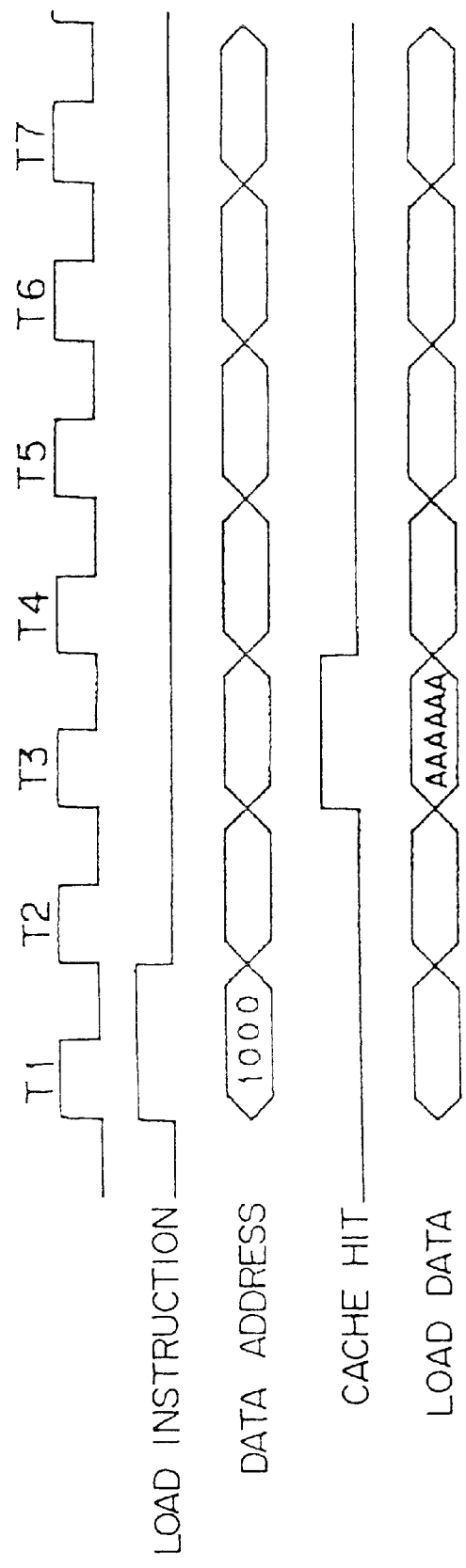
FIG. 2 is an operation time chart of a load instruction of the related art reference shown in FIG. 1.
Figure 3:
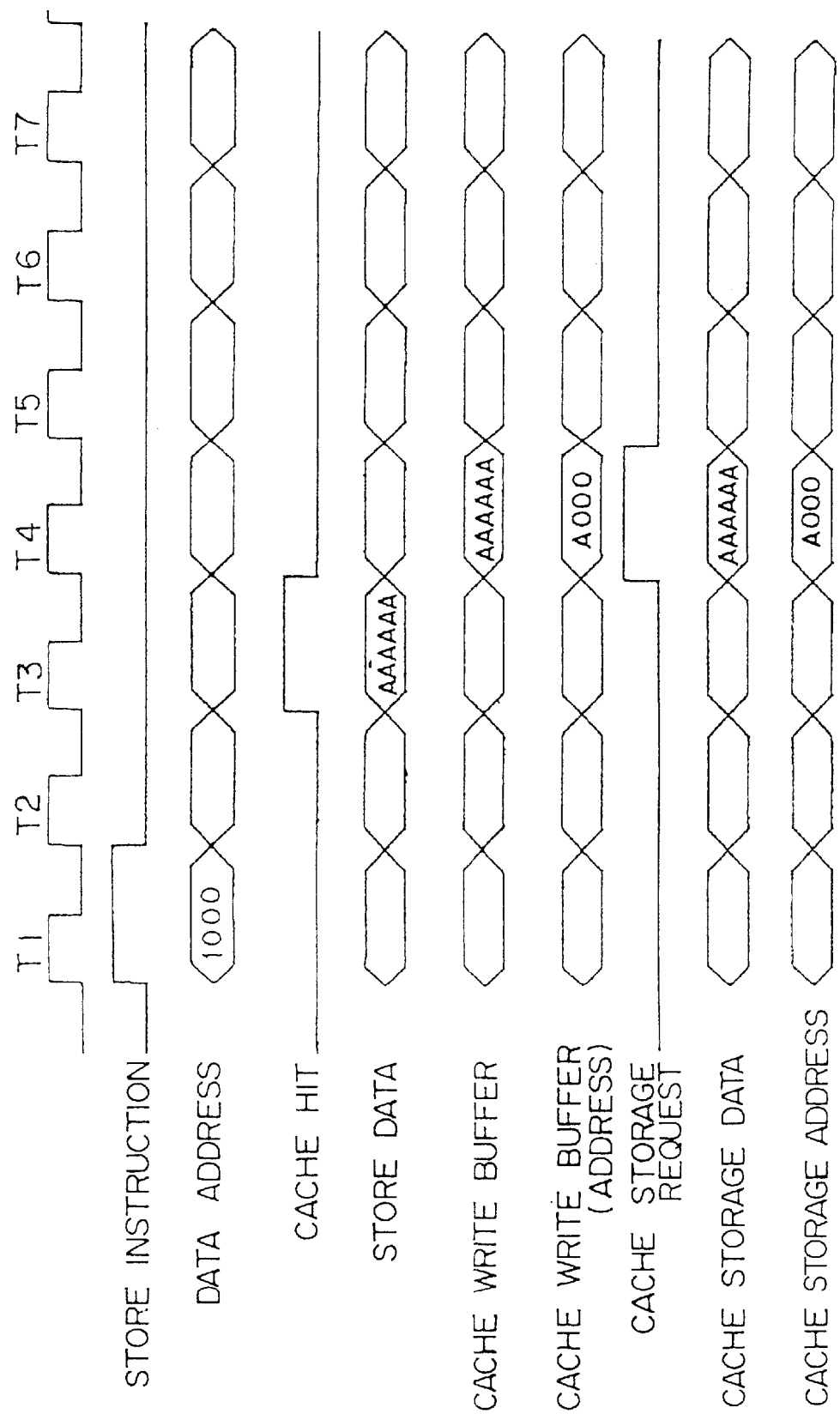
FIG. 3 is an operation time chart of a store instruction in the related art reference shown in FIG. 1.
Figure 9:
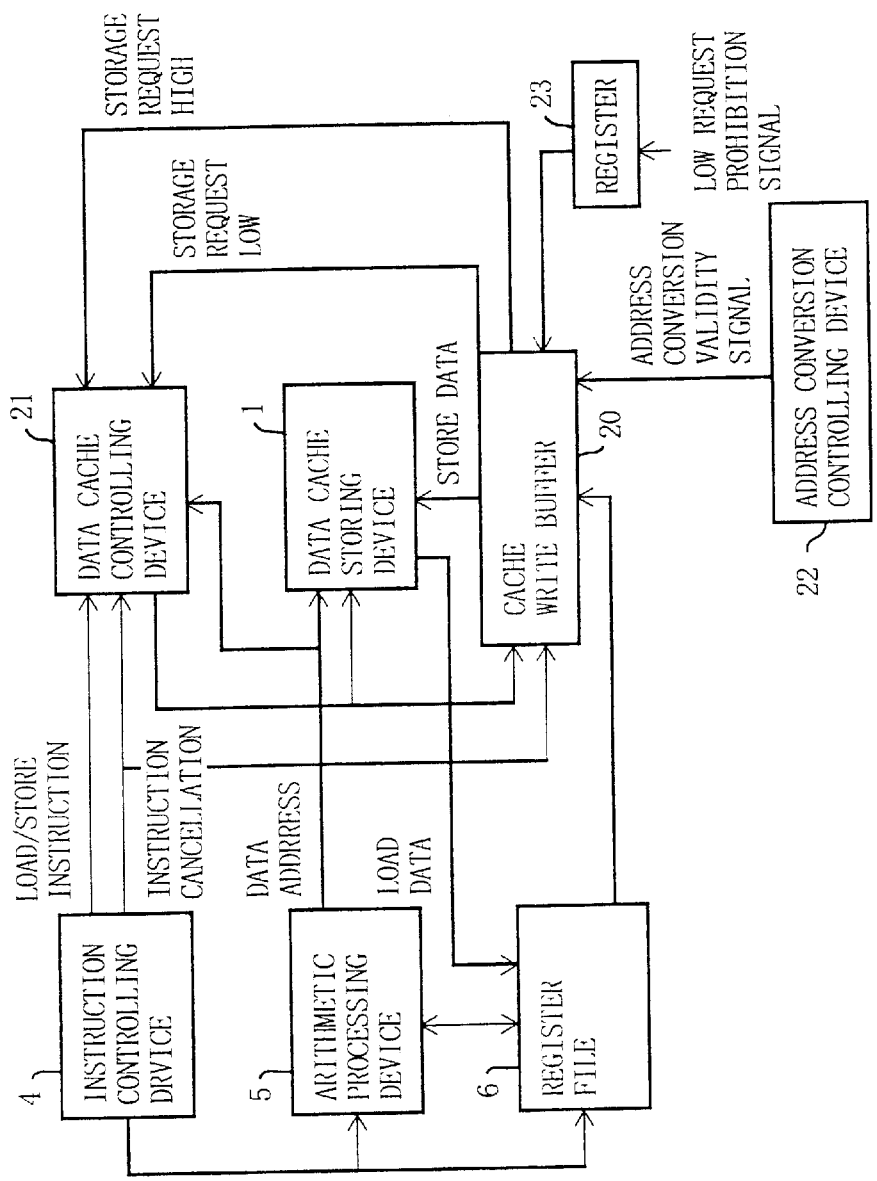
FIG. 9 is a block diagram showing the configuration of a cache block and a CPU block according to the present invention.

FIG. 9 is a block diagram showing the configuration of a cache block and a CPU block according to the present invention. For simplicity, in FIG. 9, similar portions to those of the related art reference shown in FIG. 1 are denoted by similar reference numerals. Next, the different portions from the related art reference shown in FIG. 1 will be described. An instruction controlling device 4 supplies an instruction cancellation signal to both a data cache controlling device 21 and a cache write buffer 20. When data is stored in the cache write buffer 20, the cache write buffer 20 outputs a storage request low signal or a storage request high signal that is a storage request that causes store data to be sent to a data cache storing device 1 to the data cache controlling device 21. The storage request low signal causes the data read request against the load instruction supplied to the data cache controlling device 21 to have precedence over the data storage performed in the cache write buffer 20. In contrast, the storage request high signal causes the data storage process preformed in the cache write buffer 20 to have higher precedence over the data read request against the load instruction. These signals are sent to the data cache controlling device 21.

In FIG. 9, the configuration of, for example, a microprocessor is shown. However, for a lower level of the system shown in FIG. 9, a configuration having a low level cache storing device, a main storing device, or a main storage controlling device, may be disposed.

In addition, in FIG. 9, a register 23 receives, for example, a low request prohibition signal that prohibits an address conversion controlling device 22 from outputting an address conversion validity signal to the cache write buffer 20, and the cache write buffer 20 from outputting a storage request low signal to the cache controlling device 21.

The address conversion controlling device 22 is a part of a memory management unit (MMU). When data is stored in the cache memory with a physical address, the MMU is disposed on the CPU side. When the CPU outputs only a logical address, it is converted into a physical address.

This address conversion is outside the scope of the present invention. When an error takes place in dynamic address conversion by a translation look-aside buffer (TLB), a page table is stored after the address conversion is performed. When the page table is stored in the cache memory, a cache hit takes place. Thus, all data that is stored in the cache write buffer 20 should be stored in the data cache storing device 1.

Thus, when the address conversion validity signal is issued, the storage request high signal is output from the cache write buffer 20 to the data cache controlling device 21. The data stored in the cache write buffer 20 is immediately stored in the data cache storing device 1.

Figure 4:
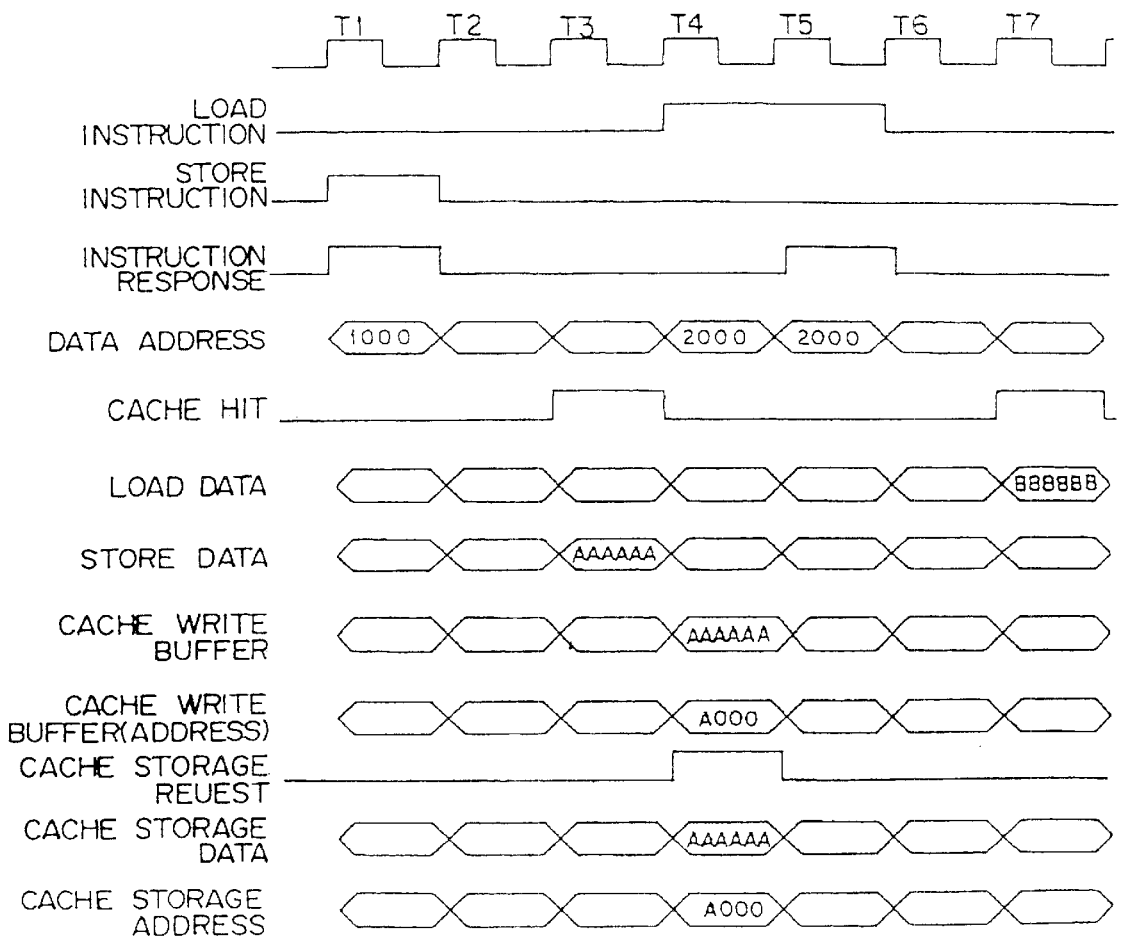
FIG. 4 is an operation time chart in the case that the store instruction contends with the load instruction (the store instruction has precedence over the load instruction) of the related art reference shown in FIG. 1.
Figure 5:
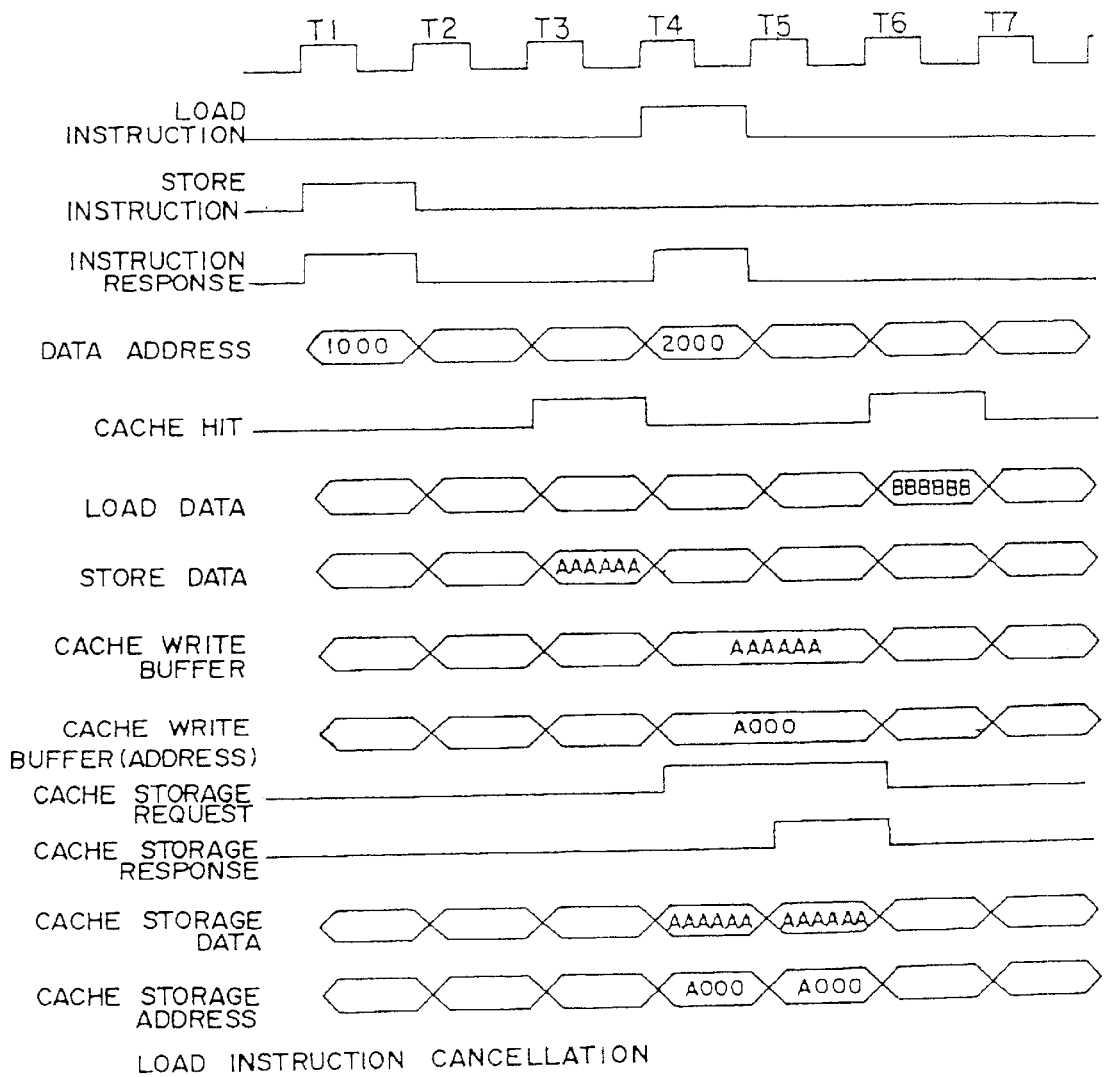
FIG. 5 is an operation time chart in the case that the store instruction contends with the load instruction (the load instruction has precedence over the store instruction) of the related art reference shown in FIG. 1.

The register 23 is also an implement dependent control resistor. When the low request prohibition flag is set in the register, the output of the storage request low signal supplied from the cache write buffer 20 to the data cache controlling device 21 is prohibited. The low request prohibition flag is set when the low request prohibition signal that is input to the register 23 is issued. This signal is issued when the store instruction has precedence over the other instruction as described in FIG. 4.

Figure 10:
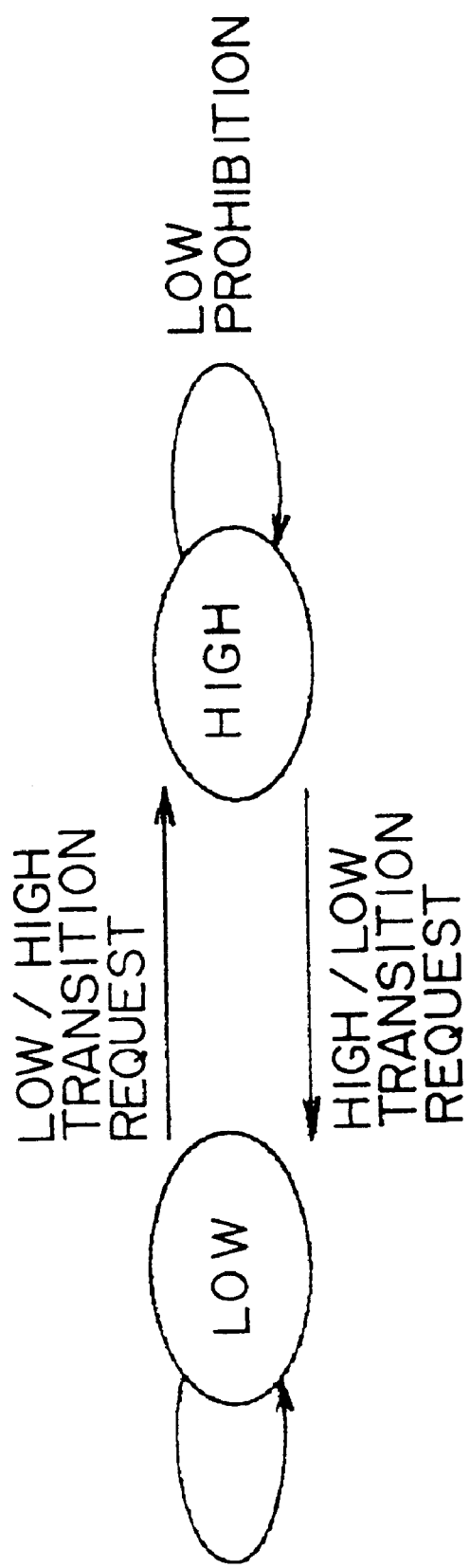
FIG. 10 is a state diagram for explaining state transition of a cache storage request according the present invention.

FIG. 10 is a schematic diagram for explaining state transition between the output state of the storage request low signal received from the cache write buffer 20 and the output state of the storage request high state shown in FIG. 9. In FIG. 10 it is assumed that when the cache storage request is in a high state, the storage request of the store data received from the cache write buffer 20 has precedence over the data read request against the load instruction. In addition, it is assumed that when the cache storage request is in a low state, the data read request has precedence over the storage request of the store data. When the system starts (namely, in the initial state), the system is set so that the cache write buffer 20 outputs, for example, the storage request low signal.

In FIG. 10, when a low request prohibition signal is issued, the state transition to the low state is prohibited. The state transition from the low state to the high state is performed when the instruction cancellation signal is input from the instruction controlling device 4 to the cache write buffer 20, when the address conversion validity signal received from the address conversion controlling device 22 is output, or when a predetermined time period elapses after the data is written to the cache write buffer 20. In addition, the transition from the high state to the low state is performed when the low request prohibition signal is not issued and valid data is not present in the cache write buffer 20. When a validity signal (not shown) is negated, it is determined that the cache write buffer stores valid data. The validity signal becomes active when valid data is written to the cache write buffer 20. When the data is stored in the data cache storing device 1, the valid data is negated.

Figure 11:
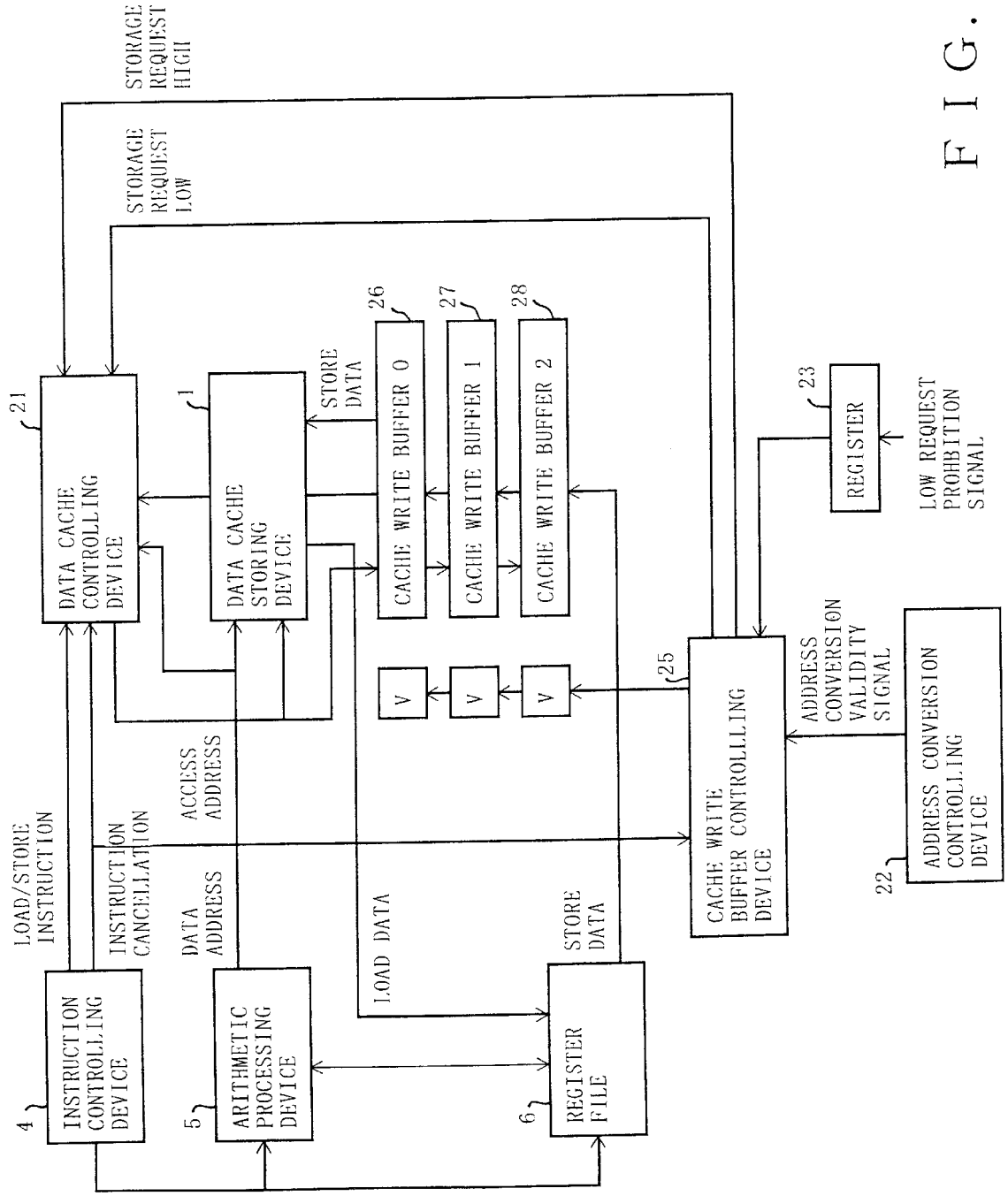
FIG. 11 is a block diagram showing the configuration of a cache block and a CPU block according to an embodiment of the present invention.

FIG. 11 is a block diagram showing the configuration of a cache block and a CPU block. In the configuration shown in FIG. 11, the cache write buffer 20 shown in FIG. 9 is constructed of a cache write buffer controlling device 25 and three cache write buffers 26 to 28.

Each of the cache write buffers 26 to 28 has a store data width of eight bytes. The cache write buffer stores data of eight bytes, an address that represents a storage position of the data, and a data validity flag. The data validity flag (V) represents that the cache write buffer stores valid data. The three cache write buffers 26 to 28 are controlled in the format of, for example, FIFO.

The cache write buffer controlling device 25 controls data input and data output of the cache write buffers 26 to 28. The address conversion controlling device 22 performs a process for converting a virtual address received from the arithmetic processing device 5 into a dynamic address in the case that the virtual address is not present in the translation look-aside buffer. The address conversion validity signal is a signal that represents that the address conversion controlling device 22 is executing the address conversion.

Figure 12:
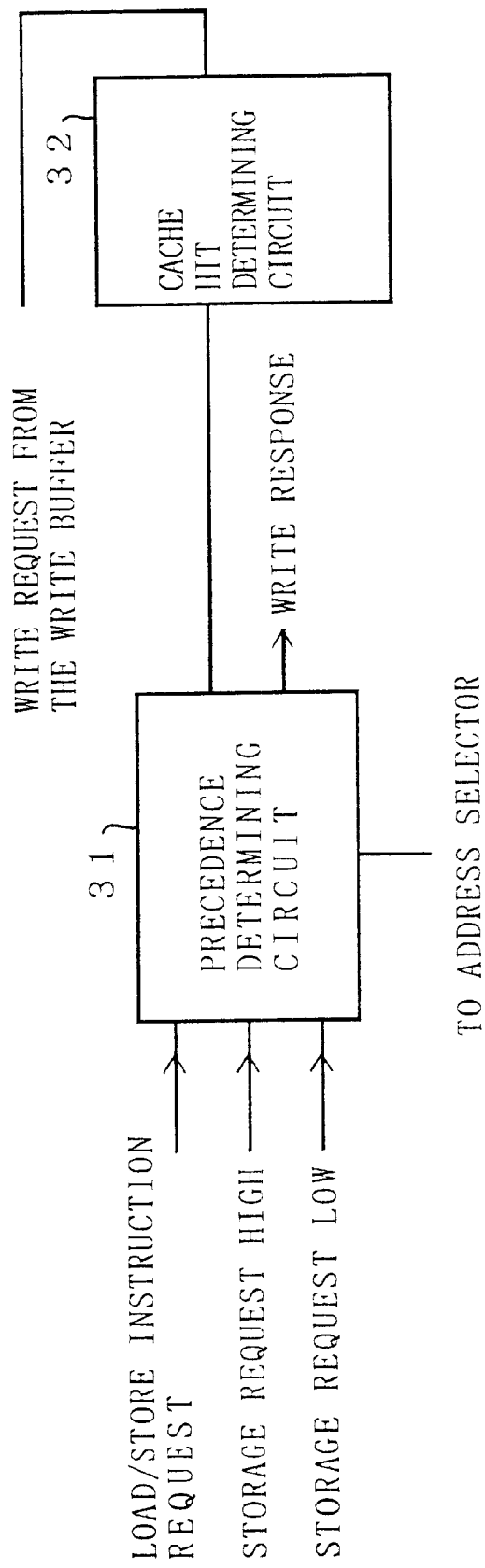
FIG. 12 is a block diagram showing the configuration of a data cache controlling device.

FIG. 12 is a block diagram showing the construction of the data cache controlling device 21 shown in FIG. 11. In FIG. 12, the data cache controlling device 21 comprises a precedence determining circuit 31 and a cache hit determining circuit 32.

The precedence determining circuit 31 determines an access right in the case that accesses to the data cache storing device 1 contend in the same cycle. The determined result is sent to an address selector (not shown).

Generally, there are a plurality of access sources to the data cache storing device 1. A plurality of addresses are output from a plurality of circuits to the data cache storing device 1. The address selector selects an address corresponding to an access source determined by the precedence determining circuit 31. An access address that is output from the data cache controlling device 21 shown in FIG. 11 is an address that is selected by the address selector.

The cache hit determining circuit 32 determines whether or not a cache hit takes place against the cache access. When the cache hit determining circuit 32 determines that a cache hit takes place corresponding to the store instruction, it outputs a data write request of the cache write buffer to the cache write buffer controlling device 25.

Figure 13:
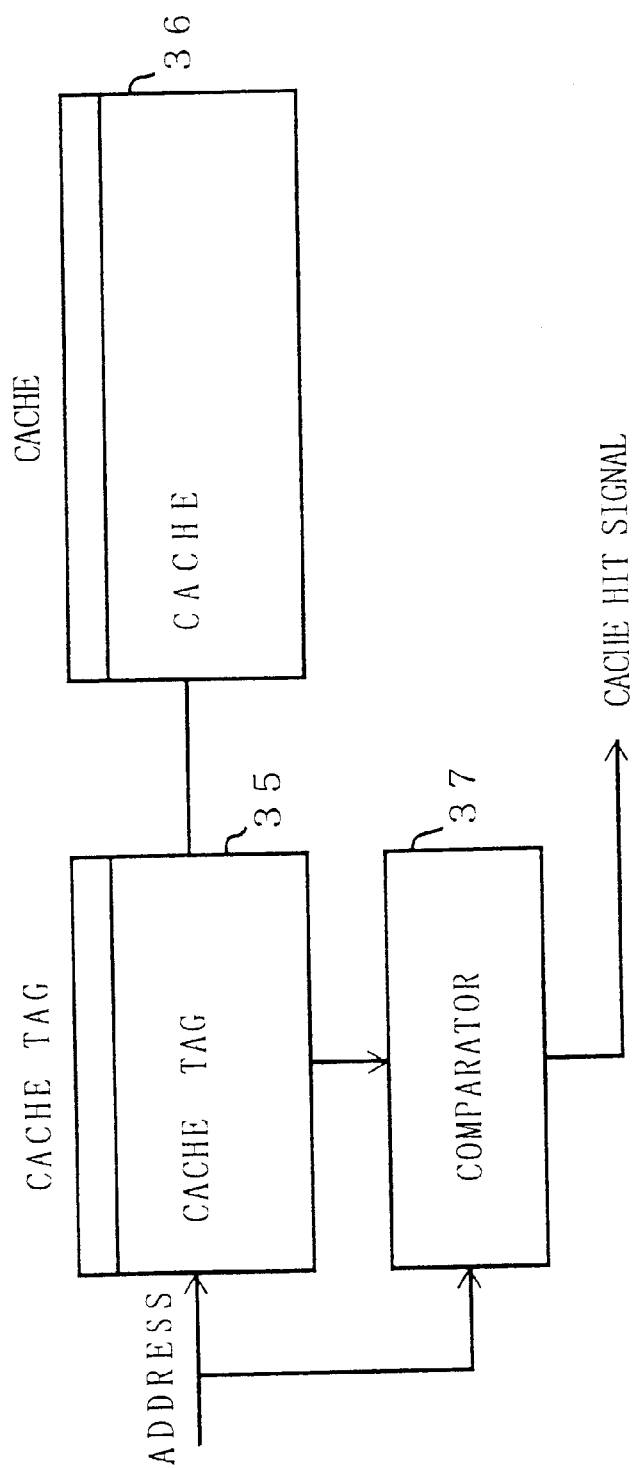
FIG. 13 is a block diagram showing the configuration of a data cache storing device.

The cache hit determining circuit 32 outputs a write request of the write buffer corresponding to the hit signal of data cache storing device 1. FIG. 13 is a block diagram showing the construction of the data cache storing device 1 that outputs the hit signal. As described above, the data cache storing device 1 comprises a cache tag 35 and a cache 36. the cache tag 35 stores high order bits of the address portion of the data stored in the cache 36. A comparator 37 compares the high order bits of the access address with high order bits stored in the cache tag 35. When these bits match, the cache hit signal is sent to the hit determining circuit 32.

Figure 14:
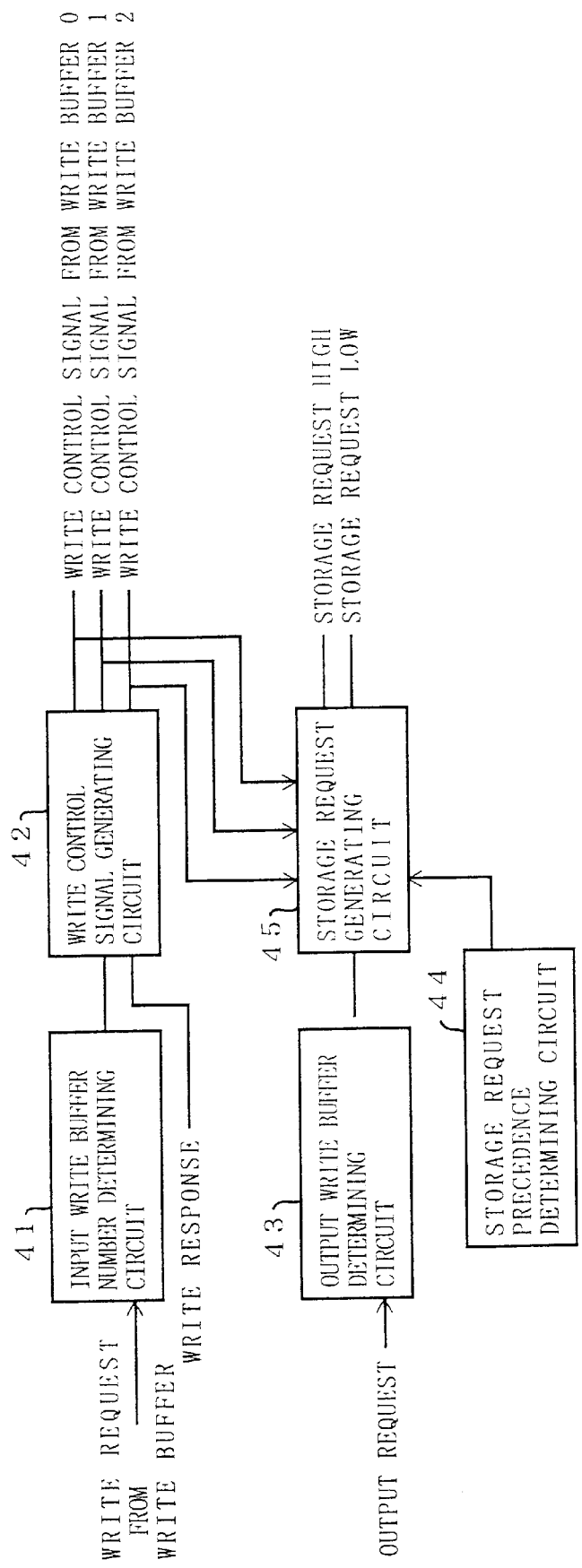
FIG. 14 is a block diagram showing the configuration of a cache write buffer controlling device.

FIG. 14 is a block diagram showing the construction of the cache write buffer controlling device 25 shown in FIG. 11. In FIG. 14, the cache write buffer controlling device 25 comprises an input write buffer number determining circuit 41 that determines to which cache write buffer the next data is written, a write control signal generating circuit 42 that generates a write control signal against the cache write buffer to which data is written, an output write buffer number determining circuit 43 that represents from what cache write buffer the data to be stored in the data cache storing device 1 is output to the data cache storing device 1, a storage request precedence determining circuit 44 that accomplishes the state transition described in FIG. 10, a write control signal generating circuit 42, an output write buffer number determining circuit 43, and a storage request generating circuit 45 that outputs a storage request high signal or a storage request low signal to the data cache controlling device 21 corresponding to the output of the storage request precedence determining circuit 44.

Corresponding to a write buffer write request that is output from the cache hit determining circuit 32 shown in FIG. 12, the input write buffer number determining circuit 41 determines to which cache write buffer the store data that is output from the register file 6 is to be written. The input write buffer number determining circuit 41 is constructed of, for example, an incrementer and, the number of the write buffer in which store data that is output from register file 6 is to be written is shown.

The write control signal generating circuit 42 generates a write buffer write controlling signal as a control signal for writing data to the cache write buffer, determined by the input write buffer number determining circuit 41. This signal is supplied as a signal equivalent to the data validity flag (V) to the cache write buffers 26 to 28 shown in FIG. 11, and the storage request generating circuit 45.

The output write buffer number determining circuit 43 determines to which write buffer the data is to be output, corresponding to the output request that is output from the data cache controlling device 21 (namely, the data storage request issued from the cache write buffer to the data cache storing device 1). The output write number determining circuit 43 is constructed of, for example, an incrementer.

The storage request generating circuit 45 outputs a storage request high signal or a storage request low signal to the data cache controlling device 21 corresponding to the outputs of the write control signal generating circuit 42, the output write buffer number determining circuit 43, and the storage request precedence determining circuit 44. The write control signal generating circuit 42 receives a write control signal from the write buffer. The write control signal represents one of write buffers 0 to 2 to which data is written from the storage request generating circuit 45. In addition, the write control signal generating circuit 42 sends a write buffer number to the data cache storing device 1. The output of the output write buffer number determining circuit 43 is used to control a selector disposed on the output side of each cache write buffer. The storage request high signal or the storage request low signal is used corresponding to the output of the storage request precedence determining circuit 44. The output state depends on whether the state is high or low as described in FIG. 10.

Figure 15:
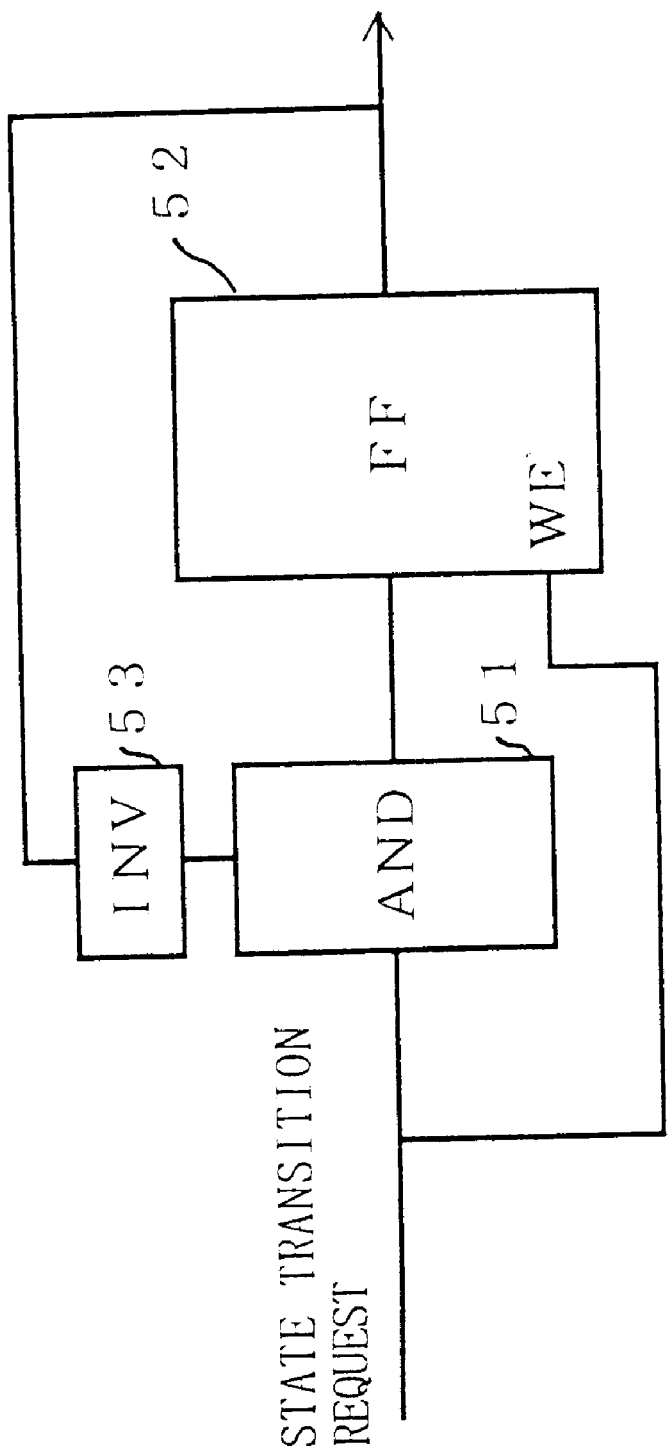
FIG. 15 is a block diagram showing an example of a circuit that accomplishes the state transition of a storage request.

FIG. 15 is a block diagram showing the configuration of a circuit that accomplishes the state transition shown in FIG. 10. In FIG. 15, the instruction cancellation signal received from the instruction controlling device 4 is received as a state transition request. Thus, the storage request low state is changed to the storage request high state.

In other words, when the signal level of the output of the flip-flop 52 is "L", if the state transition request to the AND gate 51 is changed from "L" to "H", the signal level of the input signal to the flip-flop 52 is changed to "H". At the next clock cycle, the signal level of the FF52 is changed from "L" to "H". The state transition request is issued when the instruction is cancelled, when the address conversion is valid, or when a predetermined time period (a predetermined number of cycles) elapses after data is stored in the cache write buffer.

Figure 16:
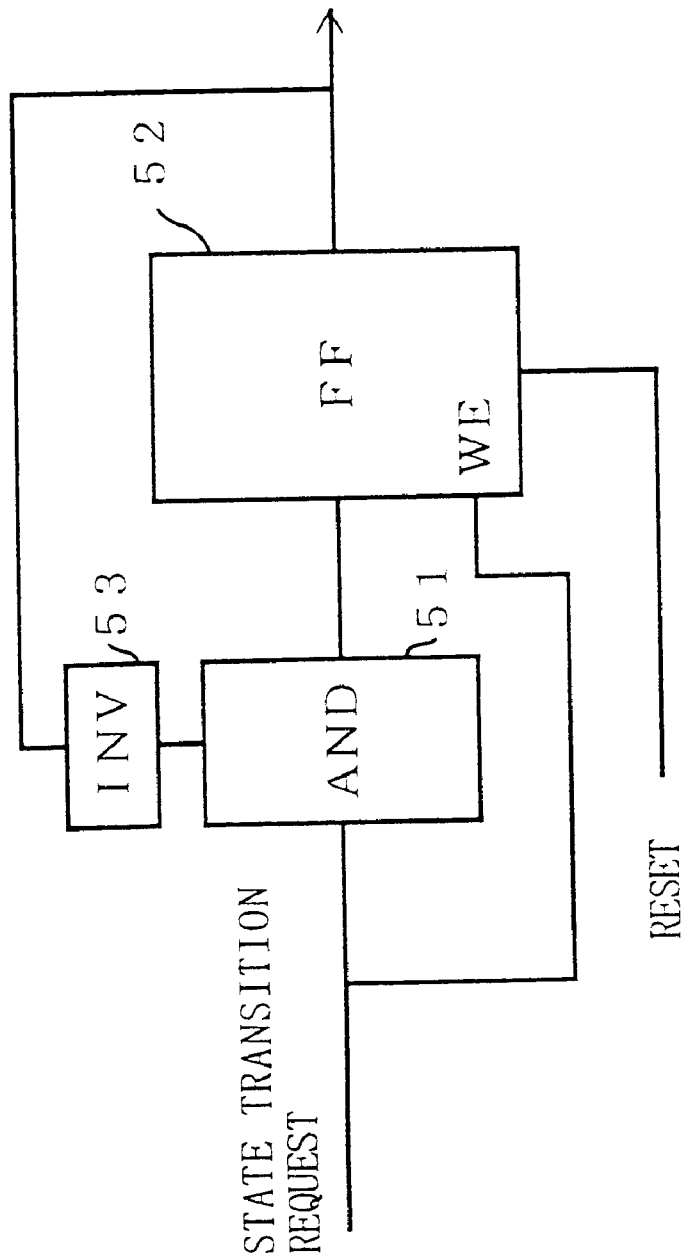
FIG. 16 is a block diagram showing an example of a circuit that outputs a storage request low signal in its initial state.

FIG. 16 is a block diagram showing a circuit that outputs a storage request low signal in the case that data is stored to the cache write buffer in the initial state. When a reset signal is supplied to the flip-flop 52 shown in FIG. 15, the storage request low signal can be output in the initial state. In FIGS. 15 and 16, it is expected that if an improper operation takes place in the state that the storage request low signal is output, a state in which the high signal is output takes place. When the cache write buffer becomes empty, the high state is changed to the low state.

Figure 17:
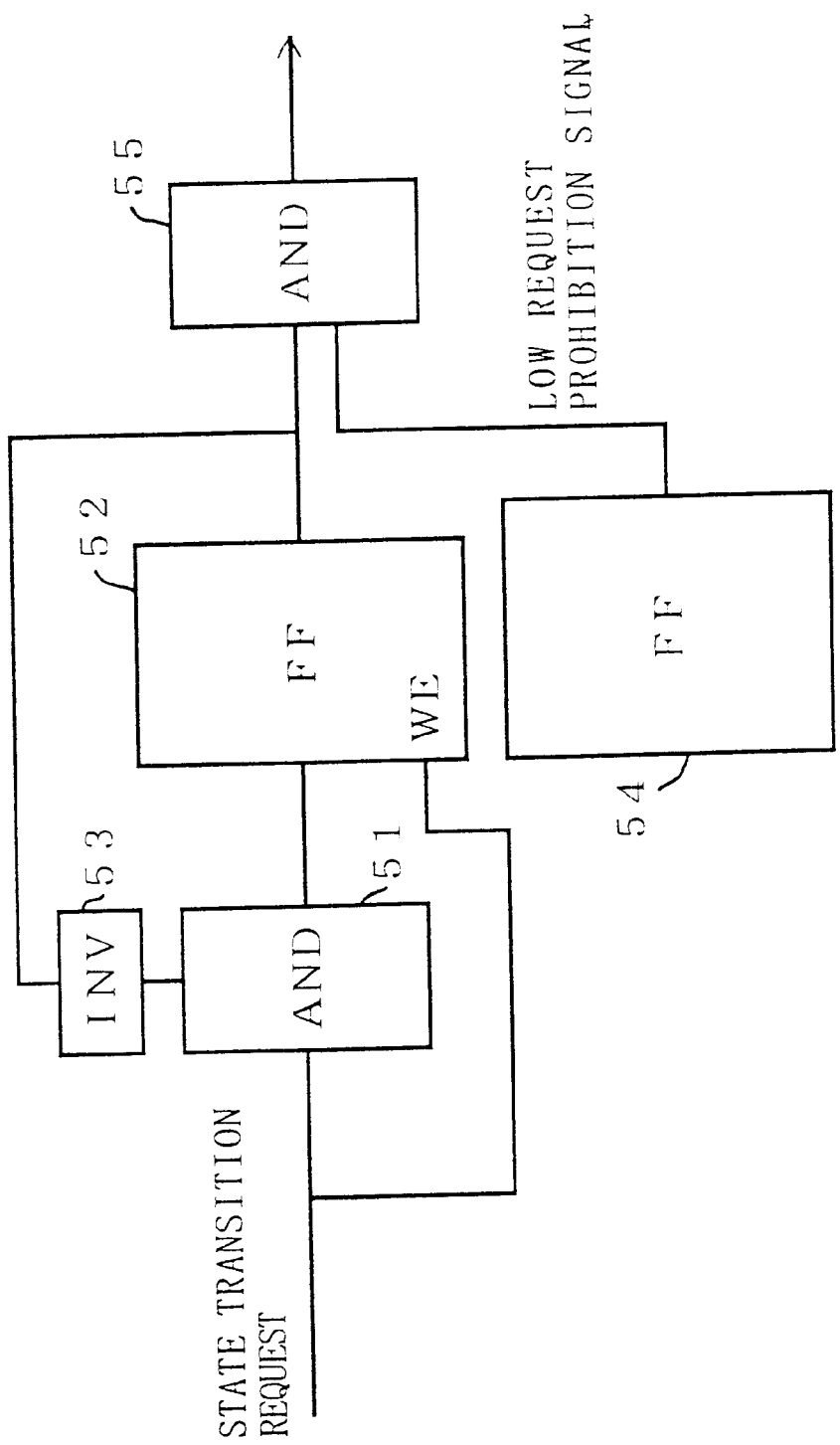
FIG. 17 is a block diagram showing an example of a state transition circuit that prohibits the output of the storage request low signal.

FIG. 17 is a block diagram showing the configuration of a state transition circuit that accomplishes the state that prohibits the output of the storage request low signal from the cache write buffer controlling device 25 to the data cache controlling device 21 in the case that, for example, the store instruction has precedence over the other instruction. The difference between the configuration shown in FIG. 17 and the configuration shown in FIG. 15 is in that an AND gate 55 is added. In FIG. 17, the outputs of two flip-flops 52 and 54 are supplied to the AND gate 55. The second flip-flip 54 is equivalent to the register 23 shown in FIG. 11. When the flip-flop 54 sends a low request prohibition signal to the AND gate 55, the signal level of the output of the AND gate 55 can be changed from "L" to "H". However, the signal level of the output of the AND gate 55 cannot be changed from "H" to "L".

Next, an operation time chart of the configuration of the embodiment shown in FIGS. 11 to 17 will be described.

Figure 18:
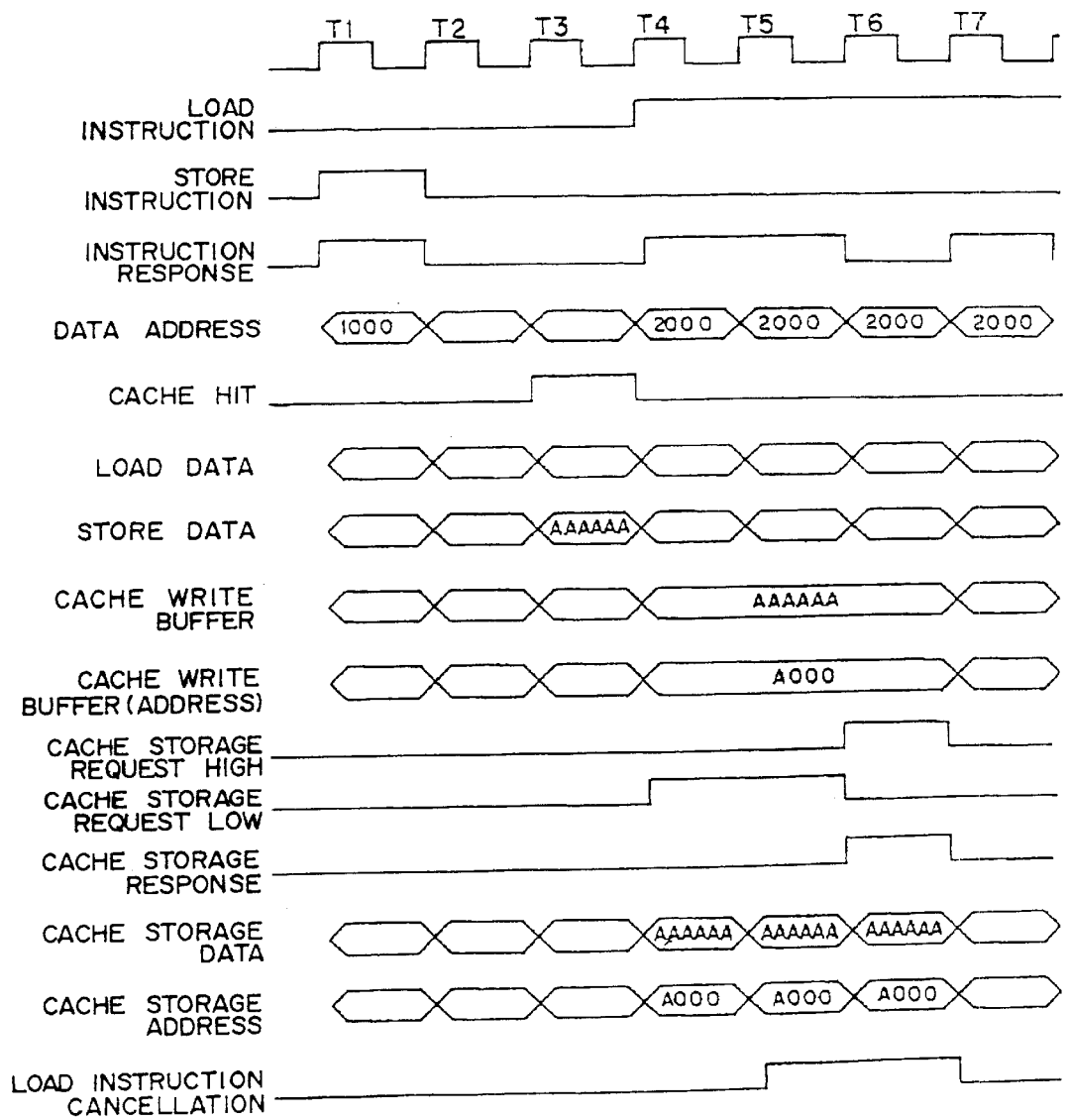
FIG. 18 is an operation time chart in the case that the store instruction contends with the load instruction according to the present invention.

FIG. 18 is an operation time chart in the case that the store instruction and the load instruction contend according to the present invention. In FIG. 18, as with the case shown in FIG. 6, the load instruction has precedence over the store instruction. The load instruction cancellation signal against the load instruction is input to the data cache controlling device 21 and the cache write buffer 20.

Figure 6:
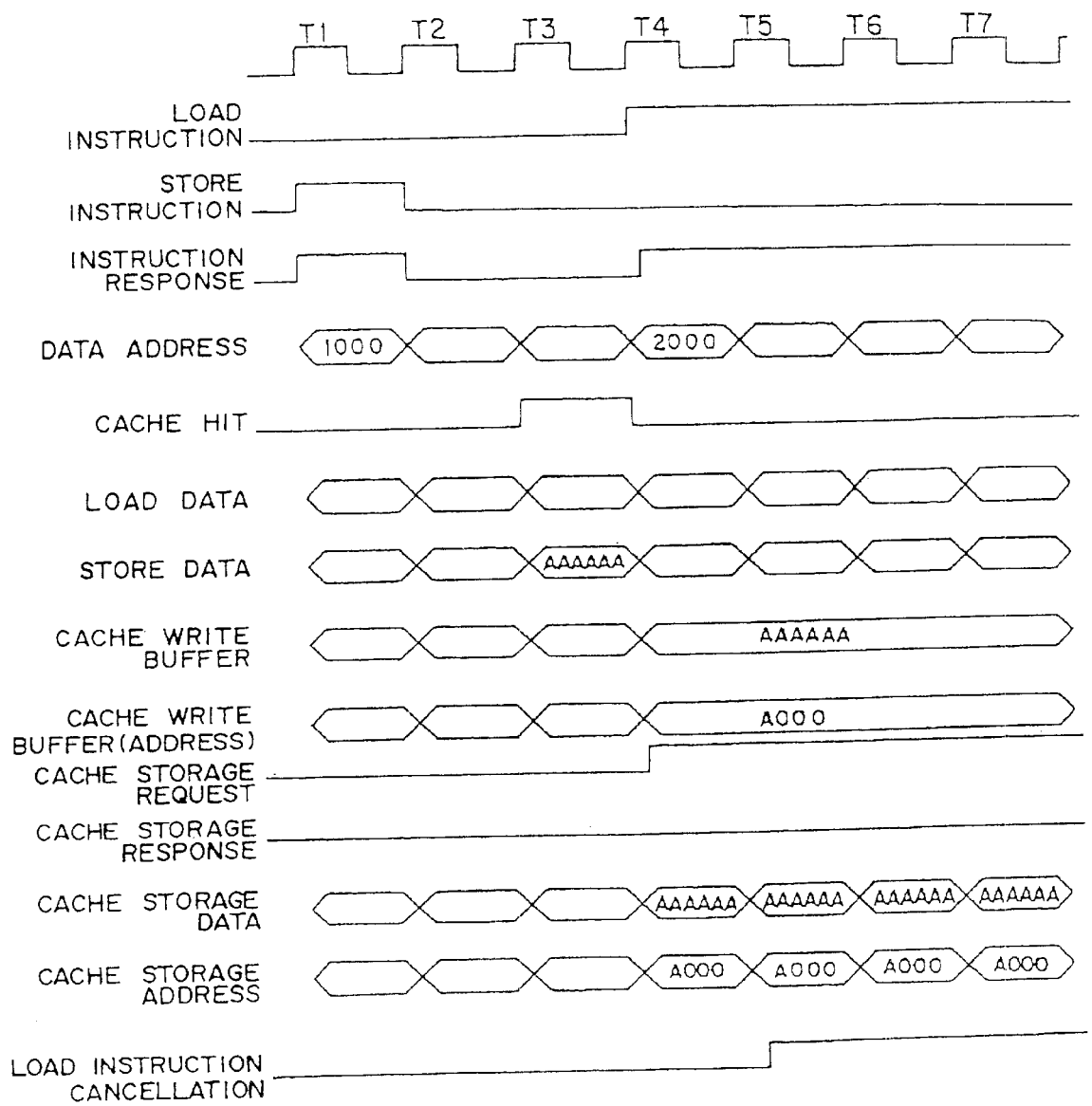
FIG. 6 is an operation time chart in the case that the load instruction to be cancelled and the store instruction contend according to the related art reference shown in FIG. 1.
Figure 7:
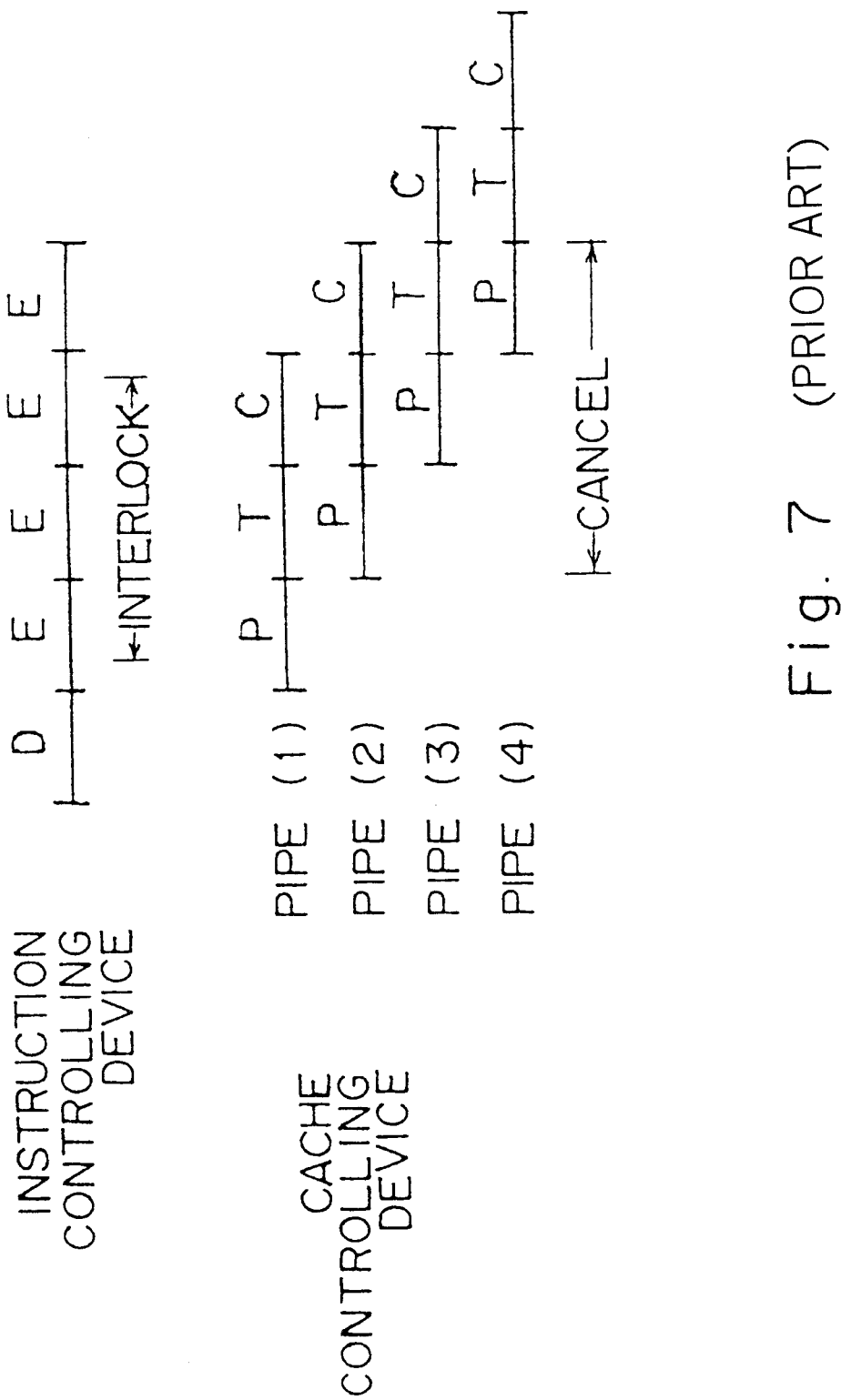
FIG. 7 is a schematic diagram for explaining the cancellation of an instruction.

The operations of the cycles T1 to T3 shown in FIG. 18 are the same as those shown in FIG. 6. At cycle T4, the load instruction is sent to the data cache controlling device 21. In addition, a storage request low signal that causes data stored in the cache write buffer 20 to be stored in the data cache storage device 1 is issued. At this point, since the load instruction has precedence over the other instruction, the instruction response to the load instruction is sent to the instruction controlling device 4. However, at cycle T5, since the load instruction cancellation signal is input to the data cache controlling device 21, the signal level of this instruction response is kept at "H".

However, at cycle T6, the load instruction cancellation signal is input to the cache write buffer 20. Thus, at cycle T6, the signal level of the storage request issued to the data cache controlling device 21 from the cache write buffer 20 is changed to "H". At this cycle, the storage request issued to the data cache storing device 1 from the cache write buffer 20 has precedence over the other operation. Thus, the signal level of the response against the load instruction becomes "L" and the cache storage response is output. The data stored in the cache write buffer 20 is stored in the RAM at cycle T7. In FIG. 18, at cycle T7, the signal level of the load instruction cancellation signal becomes "L". Thus, the load instruction that has been cancelled can be executed. The data cache controlling device 21 sends an instruction response representing that the data cache controlling device 21 has received the load instruction from the instruction controlling device 4.

Next, with reference to the operation time chart shown in FIG. 18, the operations of the individual cycles will be described in detail.

T1: The instruction controlling device 4 issues an access request corresponding to the store instruction. The arithmetic processing device 5 outputs an access address. Since the precedence determining circuit 31 in the data cache controlling device 21 does not detect an access request that has precedence over the store instruction request, the controlling device 21 issues an instruction response that represents an access permission.

T2: The data cache storing device 1 is accessed.

T3: The cache hit determining circuit 32 in the cache controlling device 21 receives a cache hit signal from the comparator 37 in the cache storing device 1. The register file 6 outputs the store data. Since the cache hit determining circuit 32 has detected the store instruction and the cache hit, the circuit 32 issues the data write request signal to be sent to the write buffer. The input write buffer number determining circuit 41 in the cache write buffer controlling device 25 outputs a write buffer number to the write control signal generating circuit 42. At the same time, the write buffer number that represents a write buffer to which the data is written is incremented. The write control signal generating circuit 42 issues the write control signal corresponding to the write buffer. The data validity signal, the address, and the data are written to the cache write buffer with the issued write control signal.

T4: When the storage request generating circuit 45 in the cache write buffer controlling device 25 has detected the issued write control signal at cycle T3, the storage request generating circuit 45 issues the cache storage request how signal against the write buffer number that represents a write buffer to which data is output from the output write buffer number determining circuit 43.

The instruction controlling device 4 outputs a new load instruction request. The arithmetic processing device outputs an access address of the load instruction.

The precedence determining circuit 31 in the cache controlling device 21 receives the load instruction request from the instruction controlling device 4 and the cache storage request low signal from the cache write buffer controlling device 25. Since the load instruction request has precedence over the cache storage request low signal, the precedence determining circuit 31 outputs the instruction response, not the cache storage response.

T5: When the storage request generating circuit 45 in the cache write buffer controlling device 25 has not detected the cache storage request signal at cycle T4, the circuit 45 issues the cache storage request low signal against the write buffer number that is output from the output write buffer determining circuit 43.

The instruction controlling device 4 outputs a new load instruction request. The arithmetic processing device 5 outputs an access address of the load instruction.

The precedence determining circuit 31 in the cache controlling device 21 receives the load instruction request from the instruction controlling device 4 and the cache storage request low signal from the cache write buffer controlling device 25. Since the load instruction request has precedence over the cache storage request low signal, the precedence determining circuit 31 outputs the instruction response, not the cache storage response.

The load instruction received at cycle T4 is cancelled due to a particular reason.

T6: When the storage request generating circuit 4 in the cache write buffer controlling device 25 has not detected the cache storage request signal at cycle T5, the storage request generating circuit 45 receives a write buffer number that represents a write buffer that is output from the output write buffer number determining circuit 43. When the storage request precedence determining circuit 44 has detected the instruction cancellation signal received from the instruction controlling device 4, the signal level of the output of the circuit 44 is changed from "L" to "H". When the storage request generating circuit 45 has detected this signal transition, it issues the cache storage request high signal.

The instruction controlling device 4 asserts a new load instruction request. The arithmetic processing device 5 outputs an access address of the load instruction.

The precedence determining circuit 31 in the cache controlling device 21 receives the load instruction request from the instruction controlling device 4 and the cache storage request high signal from the cache write buffer controlling device 25. Since the cache storage request high signal has precedence over the load instruction request, the precedence determining circuit 31 outputs the cache storage response, not the instruction response.

The load instruction that has been received at cycle T5 is cancelled due to a particular cause.

T7: Since the cache write buffer controlling device 25 has received the cache storage response at cycle T6, it invalidates the data of the corresponding write buffer.

The instruction controlling device 4 outputs a new load instruction request. The arithmetic processing device 5 outputs an access address of the load instruction.

The precedence determining circuit 31 in the cache controlling device 21 receives the load instruction request from the instruction controlling device 4.

The cache storage device 1 processes the cache storage request received at cycle T6.

Figure 19:
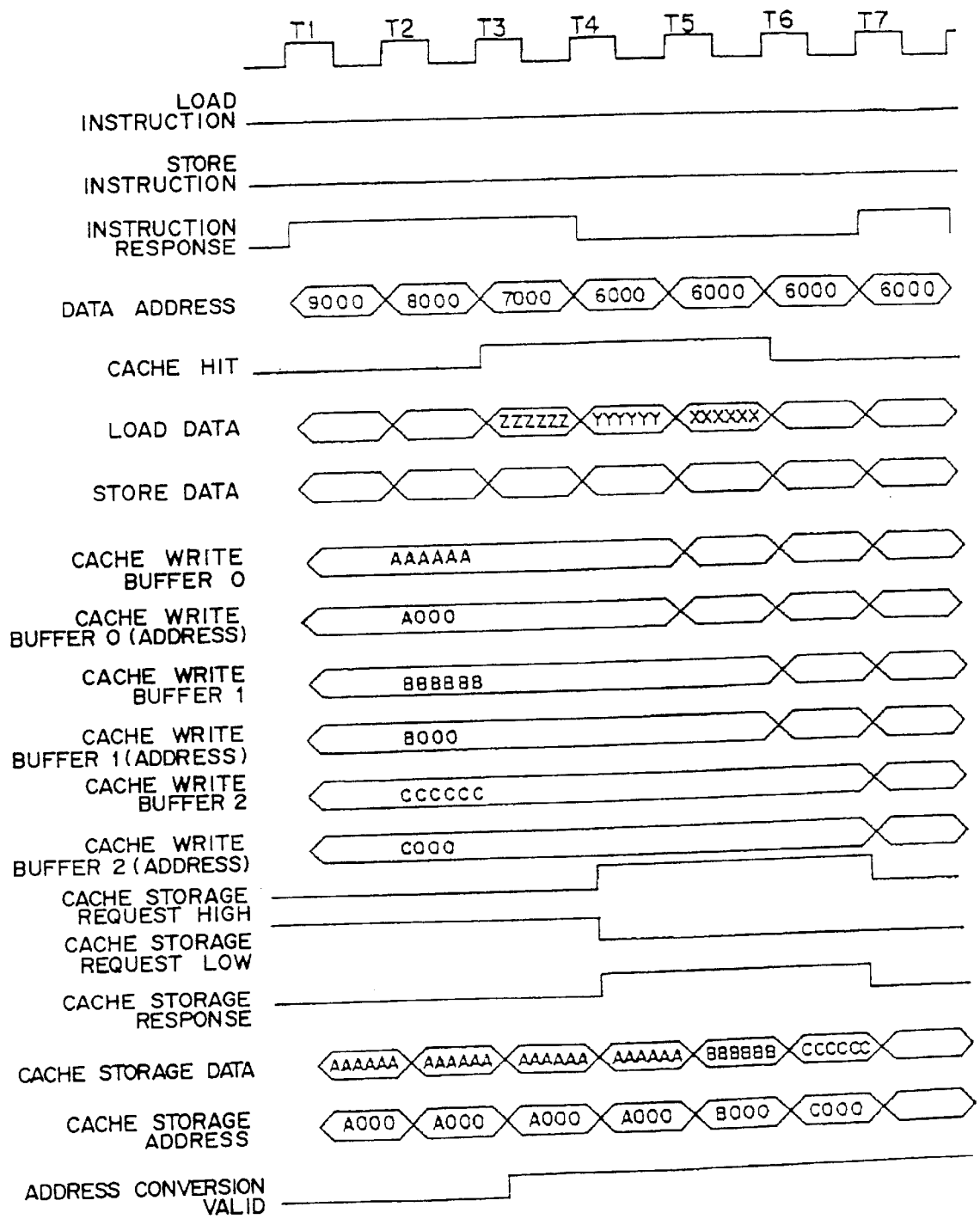
FIG. 19 is an operation time chart in the case that an address conversion validity signal is input and the store instruction contends with the load instruction.

FIG. 19 is an operation time chart in the case that a store instruction contends with a load instruction when the address conversion controlling device 22 shown in FIG. 11 performs an address conversion. In FIG. 19, it is assumed that each of three cache write buffers 26 to 28 has stored data.

In FIG. 19, it is assumed that the load instruction is continuously supplied to the data cache controlling device 21 from cycles T1 to T7. The signal level of the instruction response against the load instruction from cycles T1 to T3 is "H". Corresponding to the instruction response at these cycles, it is determined that a cache hit takes place at cycles T3 to T5. Thus, the load data is output from the data cache storing device 1 to the register file 6.

At cycle T3, the signal level of the address conversion validity signal becomes "H". The signal level of the cache storage request is changed from "L" to "H" at cycle T4. The signal level of the instruction response against the load instruction becomes "L". Thus, the data stored in the cache write buffer is sent to the cache storing device. In other words, the cache storage response signals against the data stored in the write buffer 0 at cycle T4, the data stored in the write buffer 1 at cycle T5, and the data stored in the write buffer 2 at cycle T6, are output. These data are stored in the RAM at the next cycle. At cycle T7, valid data is not present in the cache write buffer 2. Thus, the signal level of the storage request high signal becomes "L". Since the load instruction can be received, an instruction response is returned.

Next, the operations of the individual cycles of the operation time chart shown in FIG. 19 will be described in detail.

T1: Valid data has been stored in the three write buffers of the cache write buffer according to a store instruction.

The storage request generating circuit 45 in the cache write Luffer controlling device 25 issues the cache storage request low signal against a write buffer number that is output from the output write buffer number determining circuit 43.

The instruction controlling device 4 outputs a new load instruction request. The arithmetic processing device 5 outputs an access address of the load instruction.

The precedence determining circuit 31 in the cache controlling device 21 receives the load instruction request from tie instruction controlling device 4 and the cache storage request low signal from the cache write buffer controlling device 25. Since the load instruction request has precedence over the cache storage request low signal, the precedence determining circuit 31 outputs the instruction response, not the cache storage response.

T2: Valid data has been stored in the three write buffers of the cache write buffer according to a store instruction.

The storage request generating circuit 45 in the cache write buffer controlling device 25 issues the cache storage request low signal against a write buffer number that is output from the output write buffer number determining circuit 43.

The instruction controlling device 4 outputs a new load instruction request. The arithmetic processing device 5 outputs an access address of the load instruction.

The precedence determining circuit 31 in the cache controlling device 21 receives the load instruction request from the instruction controlling device 4 and the cache storage request low signal from the cache write buffer controlling device 25. Since the load instruction request has precedence over the cache storage request low signal, the precedence determining circuit 31 outputs the instruction response, not the cache storage response.

T3: Valid data has been stored in the three write buffers of the cache write buffer according to a store instruction.

The storage request generating circuit 45 in the cache write buffer controlling device 25 issues the cache storage request low signal against a write buffer number that is output from the output write buffer number determining circuit 43.

The instruction controlling device 4 outputs a new load instruction request. The arithmetic processing device 5 outputs an access address of the load instruction.

The precedence determining circuit 31 in the cache controlling device 21 receives the load instruction request from the instruction controlling device 4 and the cache storage request low signal from the cache write buffer controlling device 25. Since the load instruction request has precedence over the cache storage request low signal, the precedence determining circuit 31 outputs the instruction response, not the cache storage response.

The hit determining circuit 32 in the cache controlling device 21 receives the cache hit signal from the cache storing device 1.

The address conversion controlling device 22 issues the address conversion validity signal that represents that a new address conversion starts.

T4: Valid data has been stored in the three write buffers of the cache write buffer according to a store instruction.

When the storage request precedence determining circuit 44 in the cache write buffer controlling device 25 has detected the address conversion validity signal that had been issued at T3, the signal level of the signal.that is output from the circuit 44 is changed from "L" to "H". When the storage request generating circuit 45 has received the high request from the storage request precedence determining circuit 43 against the input of the write buffer number that is output from the output write buffer number determining circuit 43, the circuit 44 issues the cache storage request high signal.

The instruction controlling device 4 asserts a new load instruction request. The arithmetic processing device 5 outputs an access address of the load instruction.

The precedence determining circuit 31 in the cache controlling device 21 receives the load instruction request from the instruction controlling device 4 and the cache storage request low signal from the cache write buffer controlling device 25. Since the cache storage request high has precedence over the load instruction request, the precedence determining circuit 31 asserts the cache storage response, not the instruction response.

The hit determining circuit 32 in the cache controlling device 21 receives the cache hit signal from the cache storing device 1.

The address conversion controlling device 22 issues the address conversion validity signal.

T5: Since the cache write buffer controlling device 25 has received the cache storage response at cycle T4, it invalidates the data of the corresponding write buffer. When the storage request generating circuit 45 receives the write buffer number to be input from the output write buffer number determining circuit 43, the storage request generating circuit 45 receives the high request from the storage request precedence determining circuit 44 and issues the cache storage request high signal.

The instruction controlling device 4 outputs a load instruction request that has not been received at cycle T4. The arithmetic processing device 5 outputs an access address of the load instruction that has not been received at cycle T4.

The precedence determining circuit 31 in the cache controlling device 21 receives the load instruction request from the instruction controlling device 4 and the cache storage request low signal from the cache write buffer controlling device 25. Since the cache storage request high has precedence over the load instruction request, the precedence determining circuit 31 outputs the cache storage response, not the instruction response.

The hit determining circuit 32 in the cache controlling device 21 receives the cache hit signal from the cache storing device 1.

The address conversion controlling device 22 issues the address conversion validity signal.

T6: Since the cache write buffer controlling device 25 has received the cache storage response at cycle T5, it invalidates the data of the corresponding write buffer. When the storage request generating circuit 45 receives the write buffer number to be input from the output write buffer number determining circuit 43, the storage request generating circuit 45 receives the high request from the storage request precedence determining circuit 44 and issues the cache storage request high signal.

The instruction controlling device 4 outputs a load instruction request that has not been received at cycle T5.

The arithmetic processing device 5 outputs an access address of the load instruction that has not been received at cycle T5.

The precedence determining circuit 31 in the cache controlling device 21 receives the load instruction request from the instruction controlling device 4 and the cache storage request low signal from the cache write buffer controlling device 25. Since the cache storage request high has precedence over the load instruction request, the precedence determining circuit 31 outputs the cache storage response, not the instruction response.

The address conversion controlling device 22 issues the address conversion validity signal.

T7: Since the cache write buffer controlling device 25 has received the cache storage response at cycle T6, it invalidates the data of the corresponding write buffer.

The instruction controlling device 4 outputs a load instruction request that has not been received at cycle T6. The arithmetic processing device 5 outputs an access address of the load instruction that has not been received at cycle T6.

The precedence determining circuit 31 in the cache controlling device 21 receives the load instruction request from the instruction controlling device 4.

The address conversion controlling device 22 issues the address conversion validity signal.

Figure 20:
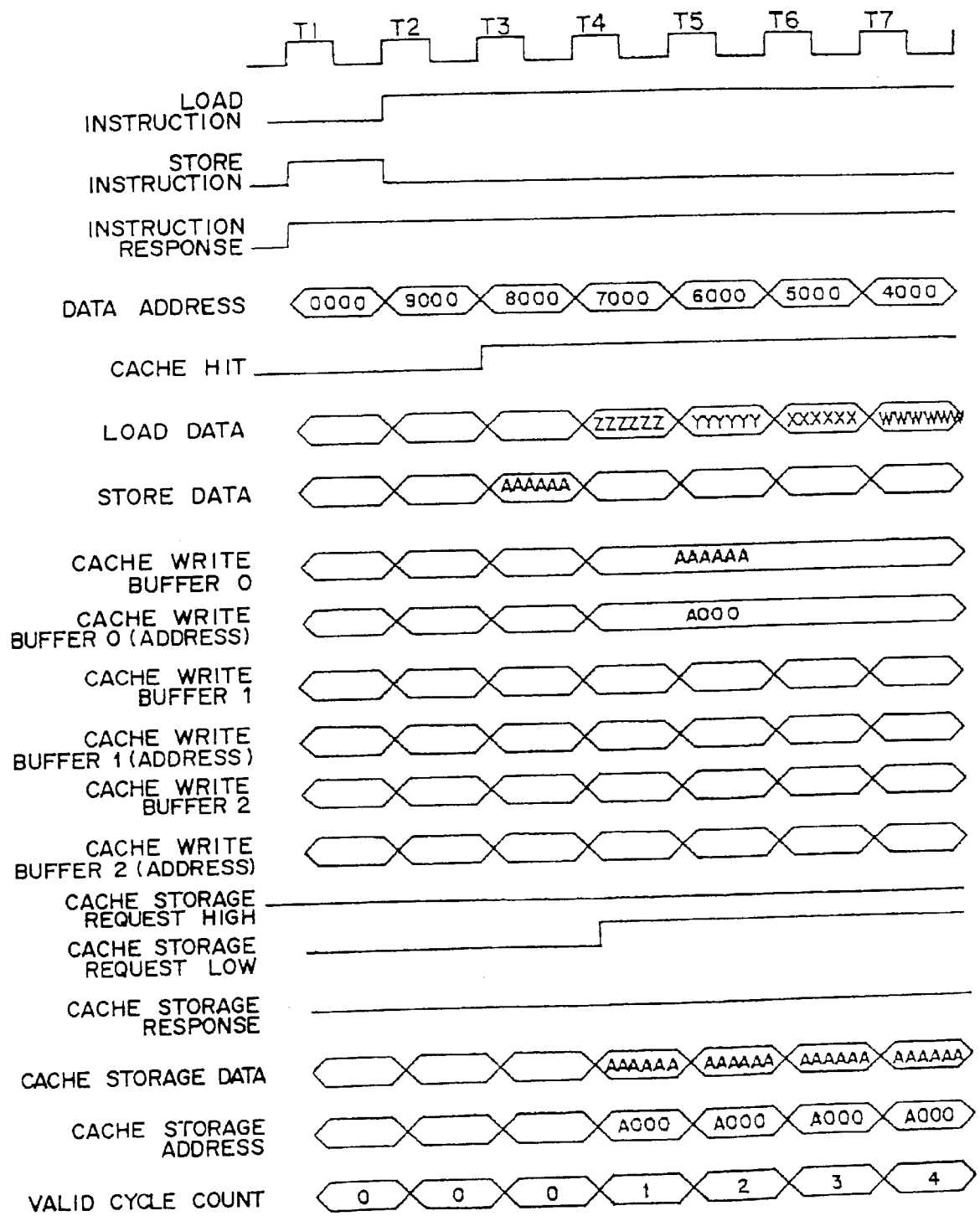
FIG. 20 is a first operation time chart in the case that a write request signal becomes high when the counted number of valid cycles exceeds a predetermined value.
Figure 21:
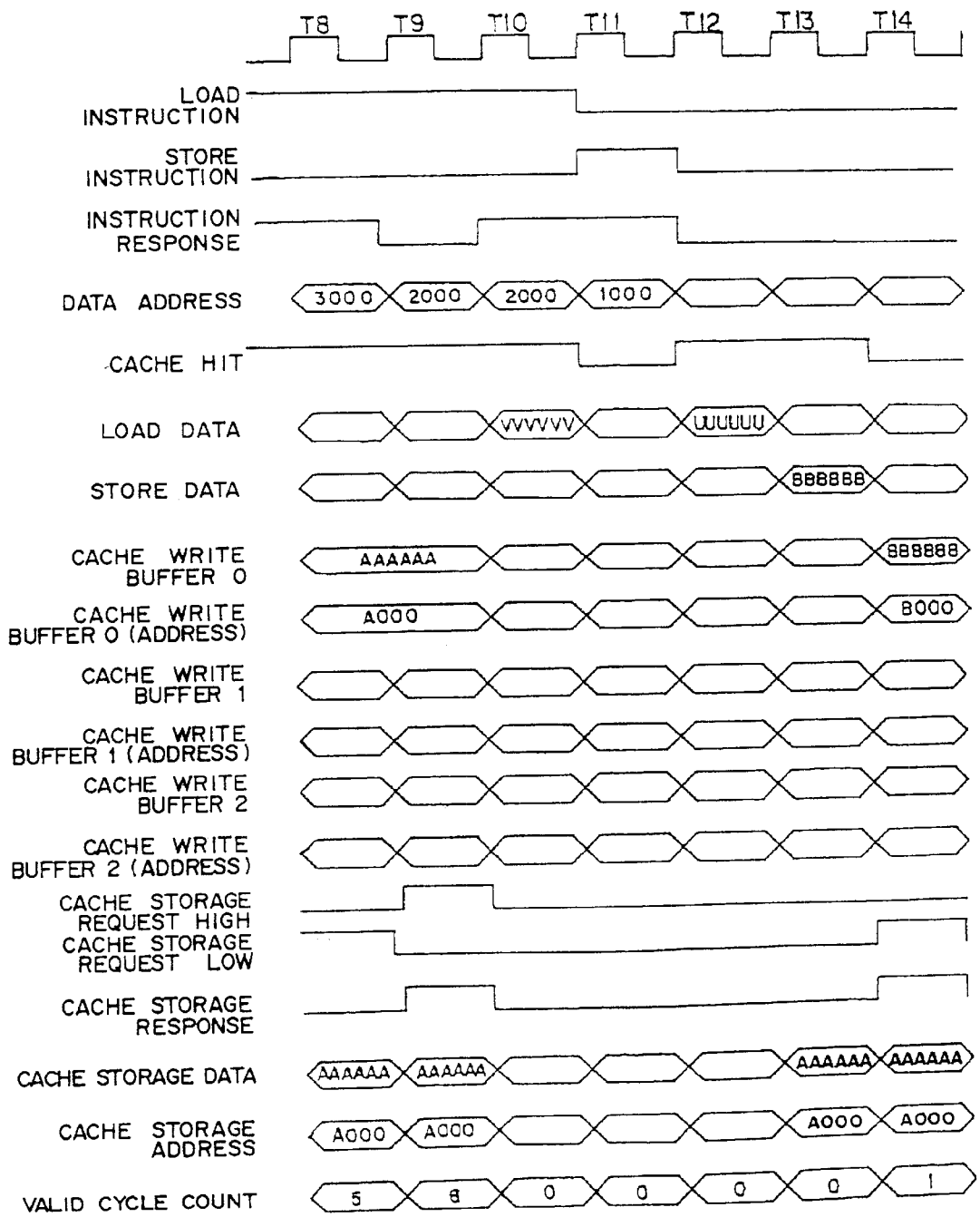
FIG. 21 is a second operation time chart in the case that a write request signal becomes high when the counted number of valid cycles exceeds a predetermined value.

FIGS. 20 and 21 are operation time charts in the case that the signal level of the cache storage request is changed from "L" to "H" when a predetermined time period elapses after data is stored in the cache write buffer. In FIG. 20, at cycle T1, the store instruction is supplied from the instruction controlling device 4 to the data cache controlling device 21 along with the data address. At cycle T3, it is determined that a cache hit takes place. The store data is output from the register file 6 corresponding to one of the cache write buffers 26 to 28. This data is written to the write buffer 0 at cycle T4. From this cycle, the cache storage request low signal is output to the data cache controlling device 21.

At cycle T2 or later, the load instruction is supplied to the data cache controlling device 21. From cycle T2 to T7, corresponding instruction responses are sent. At cycle T4 or later, the load data is successively output to the register file 6. At this point, at cycle T7, a valid cycle count number after data is written to the cache write buffer before the counting starts becomes "4".

FIG. 21 is the continuance of the operation time chart shown in FIG. 20. In FIG. 21, at cycle T8, the valid cycle count number becomes "5". In this embodiment, it is assumed that when the valid cycle count number becomes "5", the signal level of the storage request signal that is output from the cache write buffer controlling device 25 is changed from "L" to "H". Thus, at cycle T9, the signal level of the cache storage request signal becomes "H". Consequently, the signal level of the instruction response against the load instruction becomes "L". The signal level of the cache storage response signal becomes "H". The data stored in the write buffer 0 is sent to the data cache storing device 1. The data is stored in the RAM at cycle T10.

The operations of cycle T10 or later are outside the scope of the present invention. However, these operations will be briefly described. The output of the load instruction to the data cache controlling device 21 is finished at cycle T10. At cycle T1, a new store instruction is supplied to the data cache controlling device 21. The corresponding cache hit is detected at cycle T13. At cycle T14, the store data is written to the write buffer 0. The cache write buffer controlling device 25 outputs the storage request low signal. Thus, the cache storage response is returned.

Next, the operations of the individual cycles of the time charts shown in FIGS. 20 and 21 will be described in detail.

T1: The instruction controlling device 4 issues an access request corresponding to the store instruction. The arithmetic processing device 5 outputs an access address. Since the precedence determining circuit 31 in the data cache controlling device 21 does not detect an access request that has precedence over the store instruction request, the controlling device 21 issues an instruction response that represents an access permission.

T2: The data cache storing device 1 is accessed.

The instruction controlling device 4 outputs a new load instruction request. The arithmetic processing device 5 outputs an access address of the load instruction.

The precedence determining circuit 31 in the cache controlling device 21 receives the load instruction request from the instruction controlling device 4.

T3: The cache hit determining circuit 31 in the cache controlling device 21 receives a cache hit signal from the cache storing device 1. The register file 6 outputs the store data. Since the cache hit determining circuit 32 has detected the store instruction and the cache hit, the circuit 32 issues the data write request signal to be sent to the write buffer. The input write buffer number determining circuit 41 in the cache write buffer controlling device 25 outputs a write buffer number to the write control signal generating circuit 42. At the same time, the write buffer number that represents a write buffer to which the data is written is incremented. The write control signal generating circuit 42 issues the write control signal corresponding to the write buffer. The data validity signal, the address, and the data are written to the cache write buffer with the issued write control signal.

The instruction controlling device 4 outputs a new load instruction request. The arithmetic processing device 5 outputs an access address of the load instruction.

The precedence determining circuit 31 in the cache controlling device 21 receives the load instruction request from the instruction controlling device 4.

T4: When the storage request generating circuit 45 in the cache write buffer controlling device 25 has detected the issued write control signal at cycle T3, the circuit 45 issues the cache storage request low signal against the write buffer number that is output from the output write buffer number determining circuit 43. The storage request precedence determining circuit 44 starts counting the number of cycles since valid data has been written to the cache write buffer.

The instruction controlling device 4 outputs a new load instruction request. The arithmetic processing device 5 outputs an access address of the load instruction.

The precedence determining circuit 31 in the cache controlling device 21 receives the load instruction request from the instruction controlling device 4 and the cache storage request low signal from the cache write buffer controlling device 25. Since the load instruction request has precedence over the cache storage request low signal, the precedence determining circuit 31 outputs the instruction response, not the cache storage response.

The hit determining circuit 32 in the cache controlling device 21 receives the cache hit signal from the cache storing device 1.

T5: When the storage request generating circuit 45 in the cache write buffer controlling device 25 has not received the storage request low signal at cycle T4, the cache write buffer controlling device 25 issues the cache storage request low signal. Since valid data has been stored in the cache write buffer, the storage request precedence determining circuit 44 counts the number of cycles.

The instruction controlling device 4 outputs a new load instruction request. The arithmetic processing device 5 outputs an access address of the load instruction.

The precedence determining circuit 31 in the cache controlling device 21 receives the load instruction request from the instruction controlling device 4 and the cache storage request low signal from the cache write buffer controlling device 25. Since the load instruction request has precedence over the cache storage request low signal, the precedence determining circuit 31 outputs the instruction response, not the cache storage response.

The cache hit determining circuit 32 in the cache controlling device 21 receives the cache hit signal from the cache storing device 1.

T6: When the storage request generating circuit 45 in the cache write buffer controlling device 25 has not received the storage request low signal at cycle T5, the storage request generating circuit 45 issues the cache storage request low signal. Since valid data has been stored in the cache write buffer, the storage request precedence determining circuit 44 counts the number of cycles.

The instruction controlling device 4 outputs a new load instruction request. The arithmetic processing device 5 outputs an access address of the load instruction.

The precedence determining circuit 31 in the cache controlling device 21 receives the load instruction request from the instruction controlling device 4 and the cache storage request low signal from the cache write buffer controlling device 25. Since the load instruction request has precedence over the cache storage request low signal, the precedence determining circuit 31 outputs the instruction response, not the cache storage response.

The cache hit determining circuit 32 in the cache controlling device 21 receives the cache hit signal from the cache storing device 1.

T7: When the storage request generating circuit 45 in the cache write buffer controlling device 25 has not received the storage request low signal at cycle T6, the cache write buffer controlling device 25 issues the cache storage request low signal. Since valid data has been stored in the cache write buffer, the storage request precedence determining circuit 44 counts the number of cycles.

The instruction controlling device 4 outputs a new load instruction request. The arithmetic processing device 5 outputs an access address of the load instruction.

The precedence determining circuit 31 in the cache controlling device 21 receives the load instruction request from the instruction controlling device 4 and the cache storage request low signal from the cache write buffer controlling device 25. Since the load instruction request has precedence over the cache storage request low signal, the precedence determining circuit 31 outputs the instruction response, not the cache storage response.

The cache hit determining circuit 32 in the cache controlling device 21 receives the cache hit signal from the cache storing device 1.

T8: When the storage request generating circuit 45 in the cache write buffer controlling device 25 has not received the storage request low signal at cycle T7, the cache write buffer controlling device 25 issues the cache storage request low signal. Since valid data has been stored in the cache write buffer, the storage request precedence determining circuit 44 counts the number of cycles.

The instruction controlling device 4 outputs a new load instruction request. The arithmetic processing device 5 outputs an access address of the load instruction.

The precedence determining circuit 31 in the cache controlling device 21 receives the load instruction request from the instruction controlling device 4 and the cache storage request low signal from the cache write buffer controlling device 25. Since the load instruction request has precedence over the cache storage request low signal, the precedence determining circuit 31 outputs the instruction response, not the cache storage response.

The cache hit determining circuit 32 in the cache controlling device 21 receives the cache hit signal from the cache storing device 1.

T9: Since valid data has been stored in the cache write buffer, the storage request precedence determining circuit 44 in the cache write buffer controlling device 25 counts the number of cycles. Since the number of cycles stored in the cache write buffer becomes "6", the signal level is changed from "L" to "H". The storage request generating circuit 45 receives the write buffer number that is output from the output write buffer number determining circuit 43 and issues the cache storage request high signal against high request receive from the storage request precedence determining circuit 44.

The instruction controlling device 4 outputs a new load instruction request. The arithmetic processing device 5 outputs an access address of the load instruction.

The precedence determining circuit 31 in the cache controlling device 21 receives the load instruction request from the instruction controlling device 4 and the cache storage request high signal from the cache write buffer controlling device 25. Since the cache storage request high signal has precedence over the load instruction request, the precedence determining circuit 31 issues the cache storage request high signal, not the instruction response.

T10: Since the cache write buffer controlling device 25 has received a cache storage request at cycle T9, the data of the corresponding write buffer is invalidated. The storage request precedence determining circuit 44 resets the value of the cycle counter.

The instruction controlling device 4 outputs a load instruction request that has not been received at cycle T9. The arithmetic processing device 5 outputs an access address of the load instruction.

Since the precedence determining circuit 31 in the cache controlling device 21 has not detected an access request that have precedence over the load instruction request, an instruction response that represents an access permission is sent.

T11: The instruction controlling device 4 issues an access request corresponding to the store instruction. The arithmetic processing device 5 outputs an access address. Since the precedence determining circuit 31 in the data cache controlling device 21 does not detect an access request that has precedence over the store instruction request, the controlling device 21 outputs an instruction response that represents an access permission.

T12: The data cache storing device 1 is accessed.

T13: The cache hit determining circuit 32 in the cache controlling device 21 receives a cache hit signal from the cache storing device 1. The register file 6 outputs the store data. Since the cache hit determining circuit 32 has detected the store instruction and the cache hit, the circuit 32 issues the data write request signal to be sent to the write buffer. The input write buffer number determining circuit 41 in the cache write buffer controlling device 25 outputs a write buffer number to the write control signal generating circuit 42. At the same time, the write buffer number that represents a write buffer to which the data is written is incremented. The write control signal generating circuit 42 issues the write control signal corresponding to the write buffer. The data validity signal, the address, and the data are written to the cache write buffer with the issued write control signal.

T14: When the storage request generating circuit 45 in the cache write buffer controlling device 25 has detected the issued write control signal at cycle T13, the circuit 45 issues the cache storage request low signal against the write buffer number that is output from the output write buffer number determining circuit 43. Since valid data has been stored in the cache write buffer, the storage request precedence determining circuit 44 starts counting the number of cycles.

The precedence determining circuit 31 in the cache controlling device 21 receives the cache storage request low signal from the cache write buffer controlling device 25.

Figure 22:
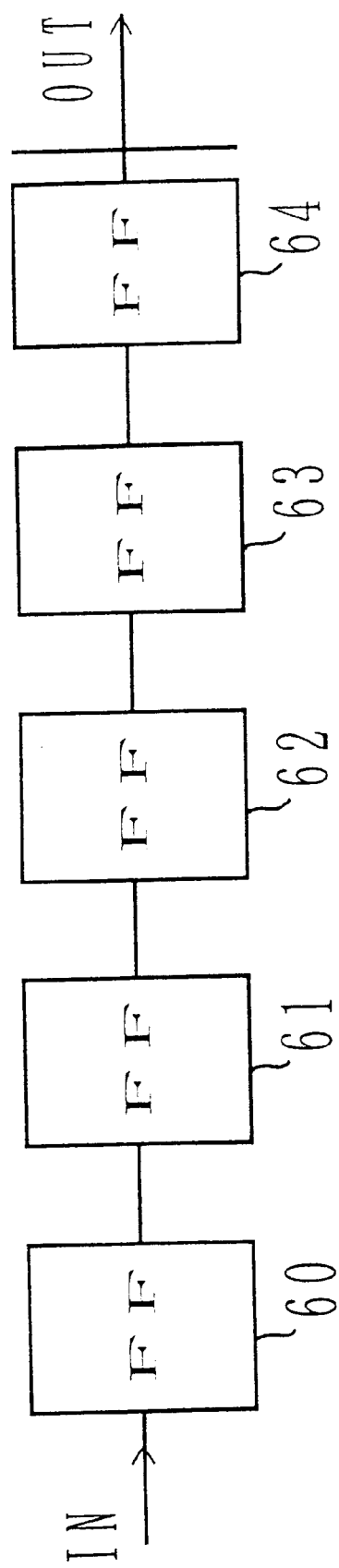
FIG. 22 is a block diagram showing an example of a circuit that counts the number of valid cycles.

FIG. 22 is a block diagram showing a circuit that counts five valid cycles as described in FIG. 21. When five cycles have been counted after data has been written to the cache write buffer, the signal level of the storage request signal is changed from "L" to "H". This circuit can be constructed of five flip-flops. The output of the flip-flops can be used as a state transition request input signal shown in FIG. 15.

As described above, according to the present invention, in the data processing apparatus with a cache write buffer that temporarily stores data in a cache memory, when a data storage request sent from the cache write buffer to the cache memory contends with a data read request received from the cache memory, data stored in the cache write buffer can be sent to the cache memory without a noticeable delay. Thus, the efficiency of data processing can be improved.

Although the present invention has been shown and described with respect to a best mode embodiment thereof, it would be understood by those skilled in the art that the foregoing and various other changes, omissions, and additions in the form and detail thereof may be made therein without departing from the spirit and scope of the present invention.

According to the present invention, the data processing apparatus with a cache memory using a cache write buffer can be used for data processing and control in many industrial applications from host computer systems to individual microcomputer systems.

What is claimed is:

1. A data processing apparatus including a cache storing device, comprising:
    a cache storage data storing unit temporarily storing data to be stored in said cache storing device; and
    a cache controlling unit executing one of a first control operation causing a data read request to have precedence over a data storage request and a second control operation causing the data storage request to have precedence with priority over the data read request in contention with the data storage request and a state transition request occurs, wherein the state transition request is presented separately from the contention, and the state transition request results from at least canceling of the data read request, wherein the cache storage data storing unit outputs a control signal to the cache controlling unit, said control signal controlling whether the cache controlling unit executes the first control operation or the second control operation and based upon whether valid data is stored in the cache storage data storing unit.

2. The data processing apparatus as set forth in claim 1, wherein said cache storage data storing unit comprises:
    at least one cache write buffer; and
    a cache write buffer controlling unit controlling data input and data output.

3. A data processing apparatus including a cache storing device, comprising:
    a cache storage data storing unit temporarily storing data to be stored in said cache storing device; and
    a cache controlling unit executing one of a first control operation causing a data read request to have precedence over a data storage request and a second control operation causing the data storage request to have precedence with priority over the data read request, when the data read request in the same cycle is in contention with the data storage request and a state transition request occurs, wherein the state transition request is presented separately from the contention;
    wherein said cache storage data storing unit comprises:
    at least one cache write buffer unit, and
    a cache write buffer controlling unit controlling data input and data output to and from said cache write buffer unit; and
    wherein said cache write buffer controlling unit outputs to the cache controlling unit one of a storage request high signal causing the data storage request of the storage data to said cache storing device to have precedence over the data read request, and a storage request low signal causing the data read request to have precedence over the data storage request to said cache controlling unit when the data is stored in one of said cache write buffer unit and wherein the state transition request results from at least canceling of the data read request, one of said storage request high signal and said storage request low signal being output by said cache write buffer controlling unit based upon whether valid data is stored in the cache data storage storing unit.

4. The data processing apparatus as set forth in claim 3, wherein said cache controlling unit causes the data read request to have precedence over the data storage request corresponding to the input of the storage request low signal received from said cache write buffer controlling unit, and causes the data storage request to have precedence over the data read request corresponding to the input of the storage request high signal.

5. The data processing apparatus as set forth in claim 3, wherein said cache write buffer controlling unit switches an output signal from the storage request low signal to the storage request high signal when an instruction of the data read request is canceled.

6. The data processing apparatus as set forth in claim 3, wherein slid cache write buffer controlling unit switches an output signal from the storage request low signal to the storage request high signal when a virtual address is converted into a physical address by an address converting device.

7. The data processing apparatus as set forth in claim 3, wherein said cache write buffer controlling unit switches an output signal from the storage request low signal to the storage request high signal when the data has been stored in at least one of said cache write buffer unit for a predetermined time period.

8. The data processing apparatus as set forth in claim 3, wherein said cache write buffer controlling unit switches an output signal from the storage request low signal to the storage request high signal when an instruction of the data read request is canceled, when a virtual address is converted into a physical address by an address converting device, or when data has been stored in at least one of said cache write buffer unit for a predetermined time period.

9. The data processing apparatus as set forth in claim 3, wherein said cache write buffer controlling unit stops the output of the storage request high signal when valid data stored in said cache write buffer unit is stored in said cache storing device and outputs the storage request low signal when the new valid data has been written to said cache write buffer unit.

10. The data processing apparatus as set forth in claim 3, wherein said cache write buffer controlling unit is adapted for switching an output signal from the storage request low signal to the storage request high signal when an instruction of the data read request is canceled, when a virtual address is converted into a physical address by an address converting device, or when data has been stored in at least one of said cache write buffer unit for a predetermined time period, and wherein said cache write buffer controlling unit is adapted for stopping the output of the storage request high signal when valid data stored in said cache write buffer unit is stored in said cache storing device, and for outputting the storage request low signal when the new valid data has been written to said cache write buffer unit.

11. The data processing apparatus as set forth in claim 3, wherein said cache write buffer controlling unit outputs the storage request low signal when valid data is written to said cache write buffer unit in an initial state.

12. The data processing apparatus as set forth in claim 3, further comprising:
a register outputting a low request prohibition signal for prohibiting said cache write buffer controlling unit from outputting the storage request low signal to said cache controlling unit.

13. The data processing apparatus as set forth in claim 3, wherein said cache controlling unit comprises:
a precedence determining circuit receiving the storage request high signal, the storage request low signal, a load instruction or a store instruction from an instruction controlling device in a central processing unit CPU of the data processing apparatus, and determining the precedence when accesses to said cache storing device contend; and
a cache hit determining circuit receiving an output signal from said precedence determining circuit and a cache hit signal from said cache storing device and sending a data write request for said cache write buffer unit to said cache write buffer controlling unit.

14. A method of processing data for in a cache storing device, comprising:
temporarily storing data to be stored in said cache storing device in a cache storage data storing unit; and
controlling by a cache controlling unit said cache storing device by executing based upon whether valid data is stored in the cache storage data storing unit one of a first control operation causing a data read request to have precedence over a data storage request and a second control operation causing the data storage request to have precedence with priority over the data read request, when the data read request in the same cycle in contention with the data storage request and a state transition request occurs, wherein the state transition request is presented separately from the contention, and wherein the state transition request results from at least canceling of the data read request wherein the cache storage data storing unit outputs a control signal to the cache controlling unit, said control signal controlling whether the cache controlling unit executes the first control operation or the second control operation.

15. The data processing method as set forth in claim 14, wherein said temporarily storing includes controlling data input and data output to and from a cache write buffer disposed in the cache storage data storing unit.

16. A data processing method for a cache storing device, comprising:
temporarily storing data to be stored in said cache storing device in a cache storage data storing unit; and
controlling by a cache controlling unit said cache storing device by executing based upon whether valid data is stored in the cache storage data storing unit one of a first control operation causing a data read request to have precedence over a data storage request and a second control operation causing the data storage request to have precedence with priority over the data read request, when the data read request in the same cycle is in contention with the data storage request and a state transition request occurs, wherein the state transition request is presented separately from the contention,
wherein said cache storage data storing unit outputs to the cache controlling unit one of a storage high signal causing the data storage request of the storage data to said cache storing device to have precedence over the data read request, and a storage request low signal causing the data read request to have precedence over the data storage request, when the data is stored in cache storage data storing unit and wherein the state transition request results from at least canceling of the data read request.

17. A data processing apparatus, comprising:
a cache storing device storing data;
a cache storage data storing unit temporarily storing data to be stored in said cache storing device; and
a cache controlling device controlling based upon whether valid data is stored in the cache storage data storing unit execution of a store request storing the data in said cache storing device instead of a read request reading the data from said cache storing device when the read request has precedence with priority over the store request in the same cycle in contention with the read request, and a state transition request occurs, wherein the state transition request is presented separately from the contention, wherein the state transition request results from at least a read request cancellation wherein the cache storage data storing unit outputs a control signal to the cache controlling device, said control signal controlling whether the cache controlling device executes the store request or the read request.

18. A data processing apparatus, comprising:
a cache storing device storing data;
a cache write buffer temporarily storing the data to be stored in said cache storing device;

a cache write buffer controlling device controlling transfer of data between said cache write buffer and said cache storing device; and a cache controlling device controlling execution of a read request for reading the data from said cache storing device and a store request for transferring the data temporarily stored in said cache write buffer to said cache storing device based on signals output from said cache write buffer controlling device, said signals output from said cache write buffer controlling device being based on one of receiving by said cache write buffer controlling device an instruction cancellation signal, receiving by the cache write buffer controlling device an address conversion validity signal, and awaiting executing of cycles after receiving data by said cache write buffer, wherein, while the read request has precedence with priority over the store request and the store request in the same cycle is in contention with the read request, when the data is stored in the cache write buffer, said cache write buffer controlling device changes a storage low signal output corresponding to the read request having precedence over the store request to a storage high signal output upon detection of a state transition request resulting from at least canceling of the data read request, wherein the state transition request is presented separately from the contention.

* * * * *